(12) United States Patent
Kumar et al.

(10) Patent No.: US 7,958,080 B2
(45) Date of Patent: Jun. 7, 2011

(54) IDEA PAGE SYSTEM AND METHOD

(75) Inventors: Arun Kumar, Issaquah, WA (US);
Michael Mowery, Seattle, WA (US)

(73) Assignee: Kerika, Inc., Issaquah, WA (US)

( * ) Notice: Subject to any disclaimer, the term of this patent is extended or adjusted under 35 U.S.C. 154(b) by 0 days.

(21) Appl. No.: 12/425,337

(22) Filed: Apr. 16, 2009

(65) Prior Publication Data

US 2009/0259514 A1 Oct. 15, 2009

Related U.S. Application Data

(63) Continuation of application No. 11/163,175, filed on Oct. 7, 2005, now abandoned.

(60) Provisional application No. 60/623,323, filed on Oct. 29, 2004.

(51) Int. Cl.
*G06F 15/00* (2006.01)
(52) U.S. Cl. ........... 706/62; 706/11; 706/45; 706/46; 706/47; 706/48; 715/738; 715/781; 715/788; 715/802

(58) Field of Classification Search ............... None
See application file for complete search history.

(56) References Cited

U.S. PATENT DOCUMENTS

| | | | | |
|---|---|---|---|---|
| 5,675,752 A * | 10/1997 | Scott et al. | | 715/866 |
| 6,097,389 A * | 8/2000 | Morris et al. | | 715/804 |
| 6,389,405 B1 * | 5/2002 | Oatman et al. | | 706/46 |
| 6,636,242 B2 * | 10/2003 | Bowman-Amuah | | 715/764 |
| 6,868,525 B1 * | 3/2005 | Szabo | | 715/738 |
| 7,076,736 B2 * | 7/2006 | Hugh | | 715/743 |
| 7,089,222 B1 * | 8/2006 | Lannert et al. | | 706/47 |
| 2003/0106039 A1 * | 6/2003 | Rosnow et al. | | 717/100 |
| 2005/0039133 A1 * | 2/2005 | Wells et al. | | 715/740 |

* cited by examiner

*Primary Examiner* — Omar F Fernandez Rivas
(74) *Attorney, Agent, or Firm* — ÆON Law; Adam L. K. Philipp

(57) ABSTRACT

Ideas, groups of ideas, projects, documents, and related materials may be depicted, organized, modified, and shared according to Idea Page systems, methods, and user interfaces. Published workflow templates may additionally be copied into a user context, modified, and depicted in a multi-level visual space, including first-level ideas organized and visually arranged in a first-level idea page, and second-level ideas organized and visually arranged in a second-level idea page.

20 Claims, 23 Drawing Sheets

IDEA PAGE SYSTEM AND METHOD

RELATED APPLICATIONS

This application is a continuation of U.S. application Ser. No. 11/163,175 filed on Oct. 7, 2005 now abandoned, which claims the benefit of U.S. Provisional Patent Application No. 60/623,323, entitled IDEA PAGE SYSTEM AND METHOD, filed on Oct. 29, 2004. The above-cited applications are incorporated herein by reference in their entirety, for all purposes.

BACKGROUND

Communication networks are well known in the computer communications field. By definition, a network is a group of computers and associated devices that are connected by communications facilities or links. Network communications can be of a permanent nature, such as via cables, or can be of a temporary nature, such as connections made through telephone or wireless links. Networks may vary in size, from a local area network ("LAN"), consisting of a few computers or workstations and related devices, to a wide area network ("WAN"), which interconnects computers and LANs that are geographically dispersed, to a remote access service, which interconnects remote computers via temporary communication links. An internetwork, in turn, is the joining of multiple computer networks, both similar and dissimilar, by means of gateways or routers that facilitate data transfer and conversion from various networks. A well-known abbreviation for the term internetwork is "internet." As currently understood, the capitalized term "Internet" refers to the collection of networks and routers that use the Internet Protocol ("IP"), along with higher-level protocols, such as the Transmission Control Protocol ("TCP") or the Uniform Datagram Packet ("UDP") protocol, to communicate with one another.

Likewise, projects, including projects using electronic information are well known. It could be argued that many projects, ideas, plans, communities, teams, organizations, processes and methodologies originate with a single person having a single thought—an idea, query or concern that may initially be expressed in vague terms and which may remain a private thought for some time.

Over time, this idea, query or concern could develop and take shape: it might be shared with other people; it could generate new ideas, concerns and issues; it could generate content, actions, activities, and tasks; it might be researched and formalized; it could be associated, formally or informally, with other projects, activities, initiatives, people and content; and eventually, depending upon the scope and nature of the idea and the economic, commercial, social or political environment in which the idea might develop and evolve, the original private, fuzzy idea could develop into a larger, better organized, more fully resourced, and more formally managed project.

On the other hand, the idea might remain a small, so-called "below-the-radar" effort that just concerns 1-2 people. Some ideas might cross organizational, geographic and network boundaries; others might remain local, or even private.

As people work to develop, enhance and modify their ideas, they might have access to a variety of traditional tools and technologies for idea management, content management, project management and collaboration. However, some users may find limitations with these technologies as their needs evolve. For example, each of the following technologies have undesirable limitations in their handling of ideas.

Electronic mail ("e-mail"): e-mail may be used to share ideas between people, especially those who are separated by geography and time. Despite its apparent low cost and general ubiquity, e-mail may be ineffective in managing decision-making regarding a large set of complex, often interdependent ideas, actions and content.

In the early stages of an idea's development, much of the communication may be one-to-one or one-to-few with respect to the number of people involved. As the effort expands in scope, the communication may expand to a many-to-many degree of complexity. In such circumstances, e-mail may act as a hindrance to effective decision making because of its asynchronous nature. For example, if people were to use the "Reply to All" feature that is common in e-mail clients with little discrimination, this might lead to a flood of ill-timed, unnecessary or unwanted commentary. Moreover, once users become part of an e-mail distribution list, they may find it difficult to exit the conversational loop.

Shared folders: whether implemented on LANs, WANs, virtual private networks ("VPNs"), personal area networks ("PANs"), Intranets, Extranets or the Internet, shared folders may be ineffective when the underlying information is not well structured or organized. Shared folders are often based upon an underlying hierarchical structure, and when the information being developed and shared about an idea, activity or project is not easily organized into a hierarchical structure, shared folders may not be an effective solution. It may also prove difficult with shared folders, depending upon the particular implementation within a computer or electronic device, to easily gather within a single folder all the digital content (files, databases, e-mails, bookmarks, etc.) that pertains to a particular idea, activity or project.

Project management tools: project management tools are often designed for a command-and-control environment characterized by written project definitions, defined roles for team members, and defined activities and tasks. However, users may find that the ideas they are working with are subject to frequent changes and their relatively loose structures. Such ideas may not be easily amenable to classic project management methodologies. When ideas, resources, strategies, tactics and priorities are fluid or subject to unexpected or frequent changes, project management tools may be more of a burden than an aid if the tools require frequent updates and adjustments of their views of the idea or project.

Groupware: groupware solutions are based upon the same hierarchical approach to organizing information as shared folders. Consequently, groupware may present the same disadvantages when dealing with ideas, activities and/or content that are not easily organized into a hierarchical structure.

Instant messaging: instant messaging ("IM"), voice-over-IP ("VoIP") and similar chat software may handle the exchange of relatively simple content items, such as files, within very small groups. However, they may not be equipped to handle the sharing of project context—the overall plan or strategy within which the content is most useful. Such technologies may also not always be adept at managing different access permissions for different members of a project team, where it may be desirable to control, at a granular level, who gets access to which information, as well as who has the ability to make changes to particular ideas, content or activities.

Consequently, people may find they lack a suitable method or system with which they could flexibly, effectively and/or efficiently manage the creation, sharing and management of ideas, from early incarnations as private thoughts, to more extensive ideas used in projects.

DETAILED DESCRIPTION

Figure 1:
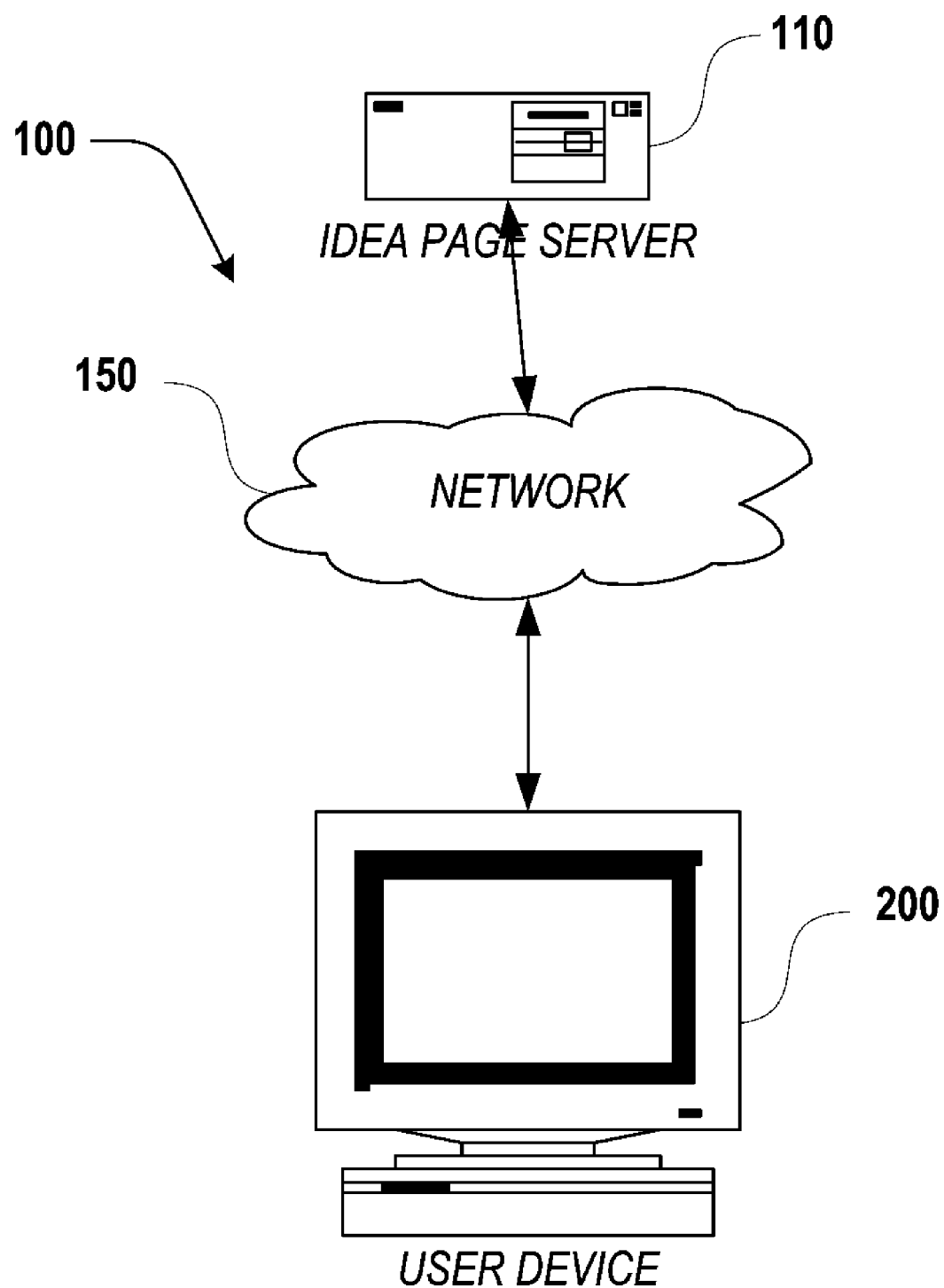
FIG. 1 is a pictorial diagram of a number of interconnected devices that provide a connected user device relationship defining functionality in accordance with various embodiments.

The detailed description that follows is represented largely in terms of processes and symbolic representations of operations by conventional computing components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components may be accessible by the processor via a communication network.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

In general, non-limiting embodiments described below have Two- or three- (or more) dimensional "Idea Pages" that could enable users to develop preliminary thoughts, questions and ideas into plans, projects, processes, methodologies or initiatives. Any collection of Ideas could be organized together on a single Idea Page; a single "Idea" could exist on more than one Idea Page; and an Idea could contain within it, recursively, multiple Idea Pages. In effect, an Idea and an Idea page are different views of the same thing. An Idea that is expanded to view its contents may be referred to as an Idea Page. Generally, workspaces in various embodiments may be viewed as Idea Pages. However, at a root level, the base Idea Page may not be viewable other than as a workspace.

The user could also organize his/her digital content (e.g., files, e-mails, bookmarks, etc.) as well as tasks, issues, notes and other lists of information around the Ideas on his/her Idea Pages. As used herein, the terms "digital content items," "digital content," and "content items" refer interchangeably to computer files, including documents, e-mails, bookmarks, and the like. As used herein, the generic term "Item" refers collectively to any of the following: Ideas; digital content items/digital content/content items; tasks; issues; notes; and other lists of information. An Item could be linked to Ideas on different Pages. The user could selectively share individual Ideas, or the items linked to individual Ideas, with other users of the system, including some circumstances where these other users may be located in different geographic locations, may be using different computer networks, may work for different organizations or might be using different types of computers and operating systems. Each item within the system could have its own Access Control List that specifies which other users may have access to the item, as well as the type of permissions each individual user might have with respect to the item. The system transmits changes on Idea Pages, individual Ideas and the items associated with Ideas to all users who are listed on the relevant Access Control List. This system could be implemented using a client-server architecture, as a hosted service run by a data center, or using a peer-to-peer network architecture. The system could be used by individuals, groups, teams, organizations and distributed communities.

FIG. 1 illustrates an exemplary Idea Page system 100 having a number of devices used in exemplary embodiments. FIG. 1 illustrates a user device 200 (illustrated in FIG. 2 and described below), a network 110, such as a wire or wireless communications network. Also in communication with the network 110 is an Idea Page Server 150. In alternate embodiments, there may be more user devices 200 and/or Idea Page Servers 150. In further embodiments, the roles of user device 200 and/or Idea Page Server 150 may be performed by an integrated device (not shown) or may be distributed across multiple other devices (not shown). In still further embodiments, still additional devices (not shown) may be utilized in the Idea Page System 100.

Figure 2:
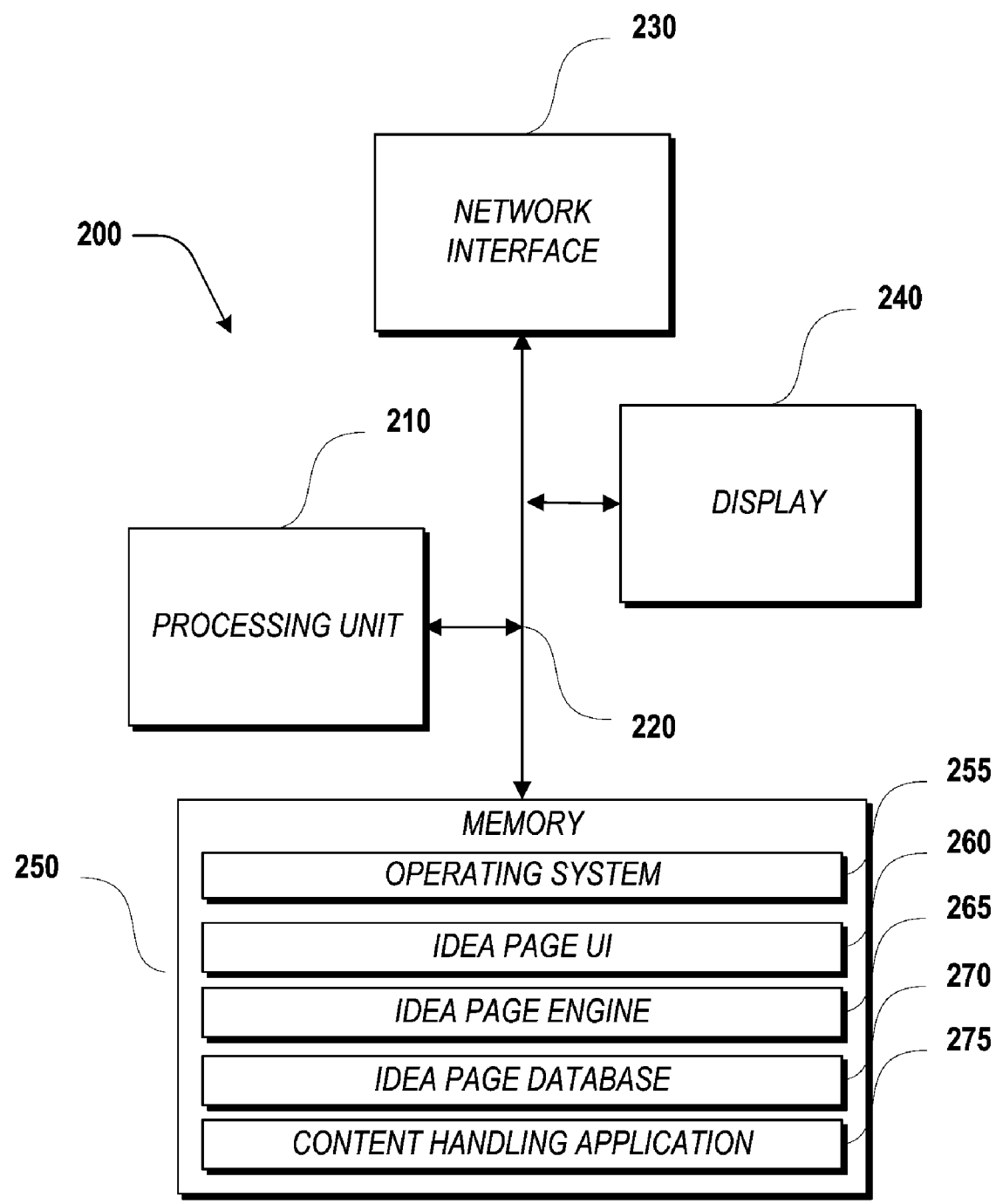
FIG. 2 is a block diagram of a user device that provides an exemplary operating environment for various embodiments.

FIG. 2 illustrates several components of an exemplary user device 200. In some embodiments, the user device 200 may include many more components than those shown in FIG. 2. However, it is not necessary that all of these generally conventional components be shown in order to disclose an illustrative embodiment. As shown in FIG. 2, the user device 200 includes a network interface 230 for connecting to the network 110. Those of ordinary skill in the art will appreciate that the network interface 230 includes the necessary circuitry for such a connection and is constructed for use with the appropriate protocol.

The user device 200 also includes a processing unit 210, a memory 250 and may include an optional display 240, all interconnected along with the network interface 230 via a bus 220. The memory 250 generally comprises a random access memory ("RAM"), a read only memory ("ROM"), and a permanent mass storage device, such as a disk drive. The memory 250 stores program code for an Idea Page User Interface ("IPUI") 260, Idea Page engine 265, Idea Page database 270 and content handling application 275. In addition, the memory 250 also stores an operating system 255. It will be appreciated that these software components may be loaded from a computer readable medium into memory 250 of the user device 200 using a drive mechanism (not shown) associated with a computer readable medium, such as a floppy disc, tape, DVD/CD-ROM drive, memory card, via the network interface 230 or the like.

Although an exemplary user device 200 has been described that generally conforms to conventional general purpose computing devices, those of ordinary skill in the art will appreciate that a user device 200 may include any of a great number of devices capable of communicating with the network 110 and/or with the Idea Page Server 150.

In conceptual terms, an Idea Page can be conceived of as a multi-dimensional visual space of indefinite length and width that could capture an arbitrary collection of ideas, concerns, suggestions, issues, reports, queries, plans, projects, initiatives, processes, methodologies, concepts, and other thoughts, all of which are collectively termed here as "Ideas."

An "Idea" may be clearly or vaguely expressed; well developed or imprecise; distinct or indistinct; structured or unstructured; mature or preliminary; organized or disorganized; actionable or conceptual; large or small; simple or complex; for individual or group use; practical or impractical.

An example of a clear, well-developed Idea might be "Create Marketing Plan for Board of Directors."

An example of an imprecise or preliminary Idea might be "vacation plan." An example of a vague, impractical idea might be "live on Mars."

Ideas could be expressed using a variety of alphanumeric characters with or without punctuation marks and other grammatical artifacts. An Idea need not be expressed in any known human language, be spelled correctly, be grammatically correct, or appear sensible, valuable, relevant or important to anyone other than the person who created the Idea.

In some embodiments, Ideas could also be expressed using symbols (e.g., road signs, flowchart symbols, etc), shapes (e.g., geometric, standardized, etc.) and pictures (e.g., thumbnails, photographs, etc).

Furthermore, in some embodiments, Ideas could symbolize actions; represent or reference tasks, issues, questions, plans, processes and methodologies; represent or reference relationships (e.g., an arrow or line connecting one or more Ideas).

In some embodiments, when displaying Ideas where characters were used to express an Idea, the characters could be formatted for display or printing using methods such use of different fonts, colors, sizes and enhancements (e.g., boldface, underline, italic, etc.) and alignments (left, center, right, etc.). Additionally, Ideas could be organized into lists (e.g., bulleted, numbered, etc.)

If, for example, symbols or shapes were used to express an Idea, these could be highlighted or embellished with colors, gradients, patterns, shading, shadow and 3-D graphical effects, flashing or inverse video effects, etc.

Figure 3:
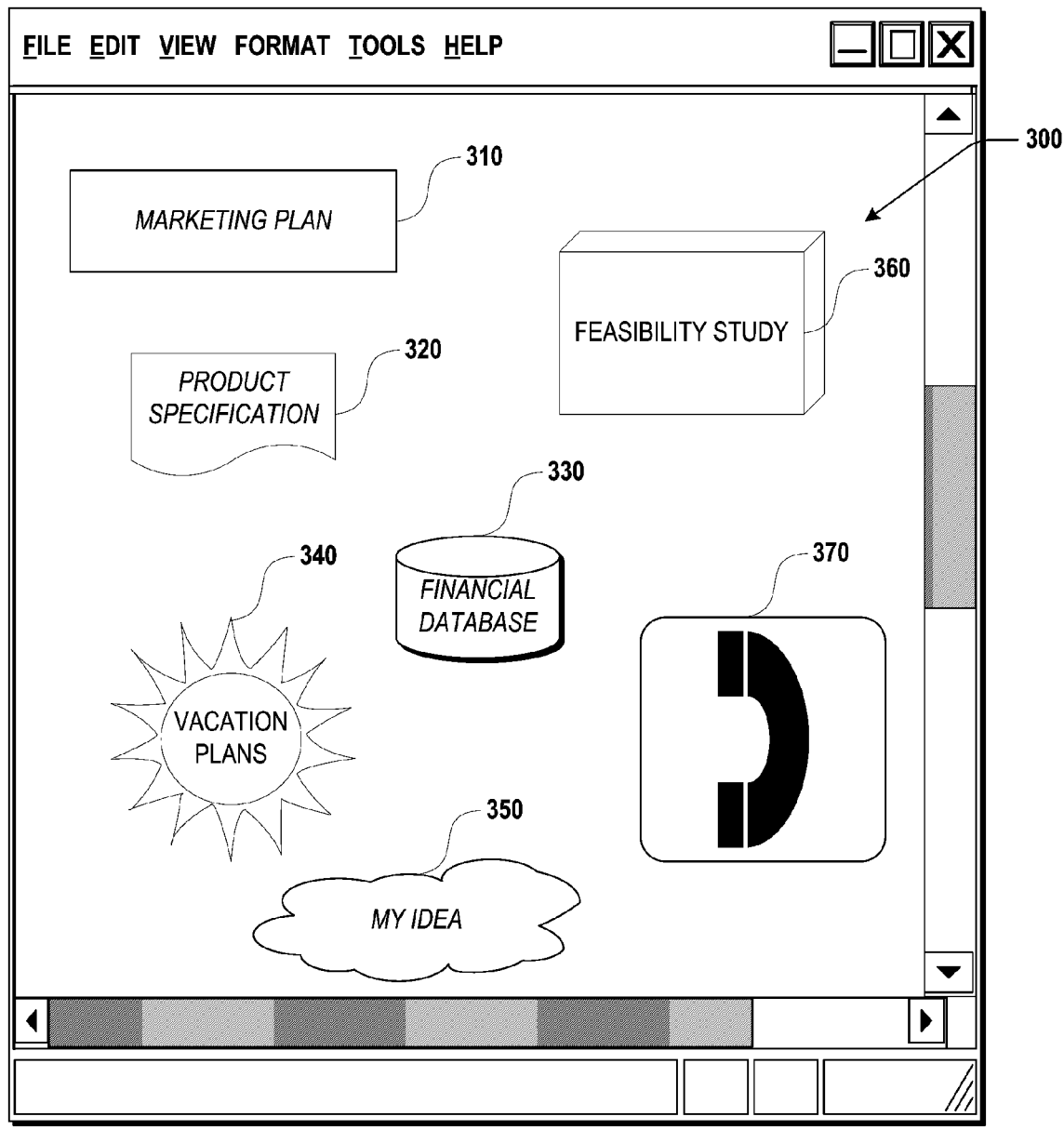
FIGS. 3-5 illustrate exemplary screenshots of Idea Pages with multiple Ideas in accordance with various embodiments.

FIG. 3 shows an example of an Idea Page 300 containing Ideas 310-370 expressed as formatted text and graphical symbols.

Individual Ideas could be placed anywhere on an Idea Page, and they could be moved freely around the Page at any time, and often as desired, by any authorized person. Ideas could be gathered together arbitrarily on a Page, or they could be arranged within the Page to convey a specific meaning or intention such as a project plan, proposal or initiative.

Ideas on the same Idea Page could have any type of relationship between them, and Ideas located on different Idea Pages could have any type of relationship between them. Ideas located on the same Idea Page need not have any defined relationship between them: they could be an arbitrary mix of Ideas that happen to be co-located on the same Page.

Figure 4:
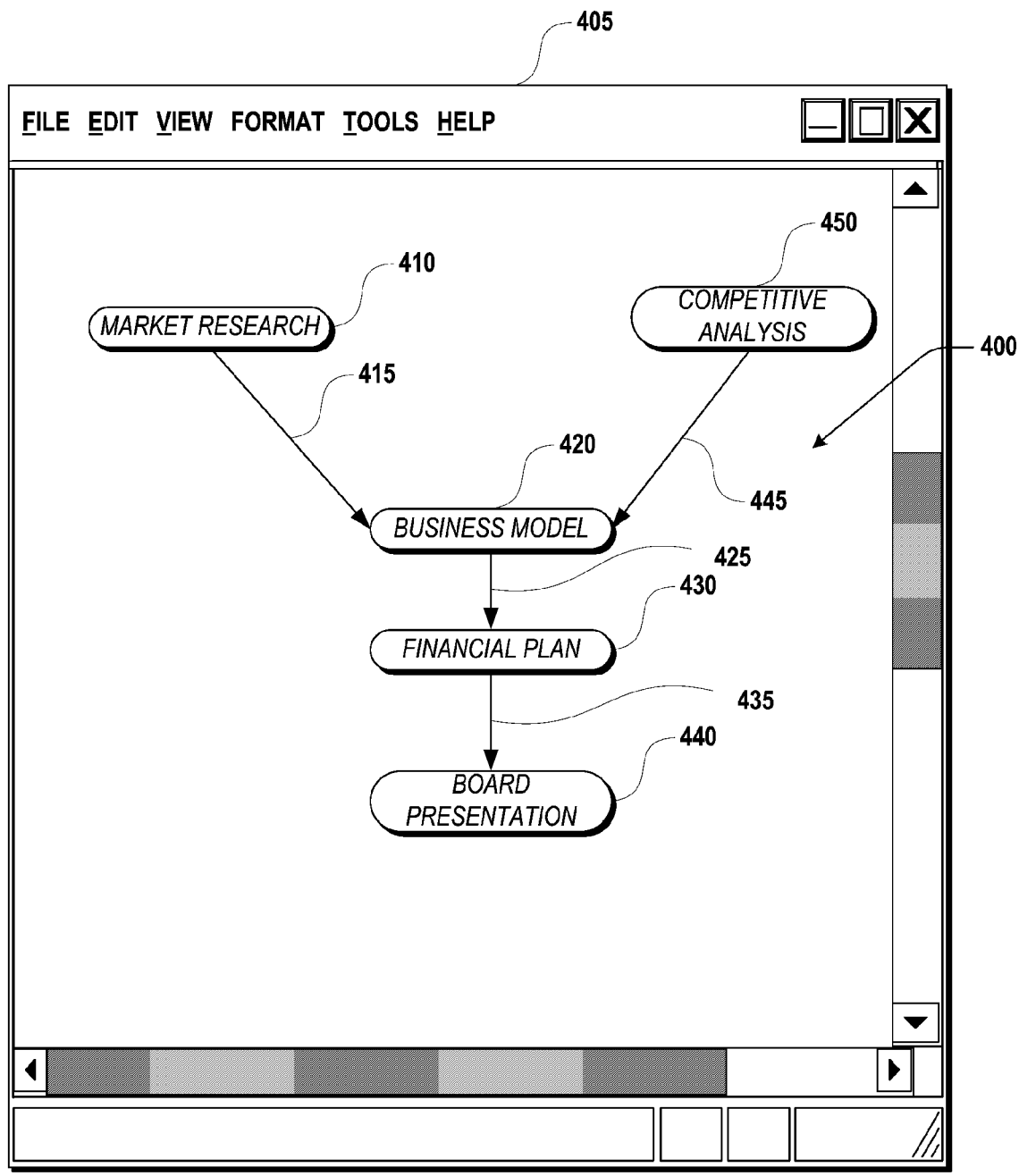

FIG. 4 illustrates an example of a "Startup" Idea Page 400 in an Idea Page compatible application 405 containing several Ideas that have been organized to convey a process workflow. This Idea Page 400 contains nine Ideas 410-445, of which four are arrow shapes 415, 425, 435, 445. In this example, the Ideas 410-445 are arranged to show Ideas that relate to a startup company. Namely, "Market Research" 410, "Business Model: 420, "Financial Plan" 430, "Board Presentation" 440 and "Competitive Analysis" 450 and their interconnecting association Ideas 415, 425, 435, 445.

New Ideas could be added to an existing Idea Page and old Ideas modified, deleted, moved or reorganized at any time by any authorized person.

Ideas could be opaque, translucent or fully transparent, and they could be placed to overlap or obscure other Ideas on the same Page.

Ideas could be (optionally) linked to other Ideas. For example, an Idea could be expressed as an arrow shape that connects two other Ideas. FIG. 4 shows four examples of arrows linking other ideas that are contained within the elliptical shapes.

An Idea, howsoever expressed, is assumed to have intrinsic meaning and value to the person who placed it on an Idea Page. An Idea could have meaning or value on a stand-alone basis, and it could have additional meaning or value based upon its proximity or relationship to other Ideas. For example, an Idea might be expressed as "This is a good plan"; if this Idea is considered in conjunction with another Idea such as "Marketing Plan," the first Idea could be interpreted as a comment on the second Idea.

Figure 5:
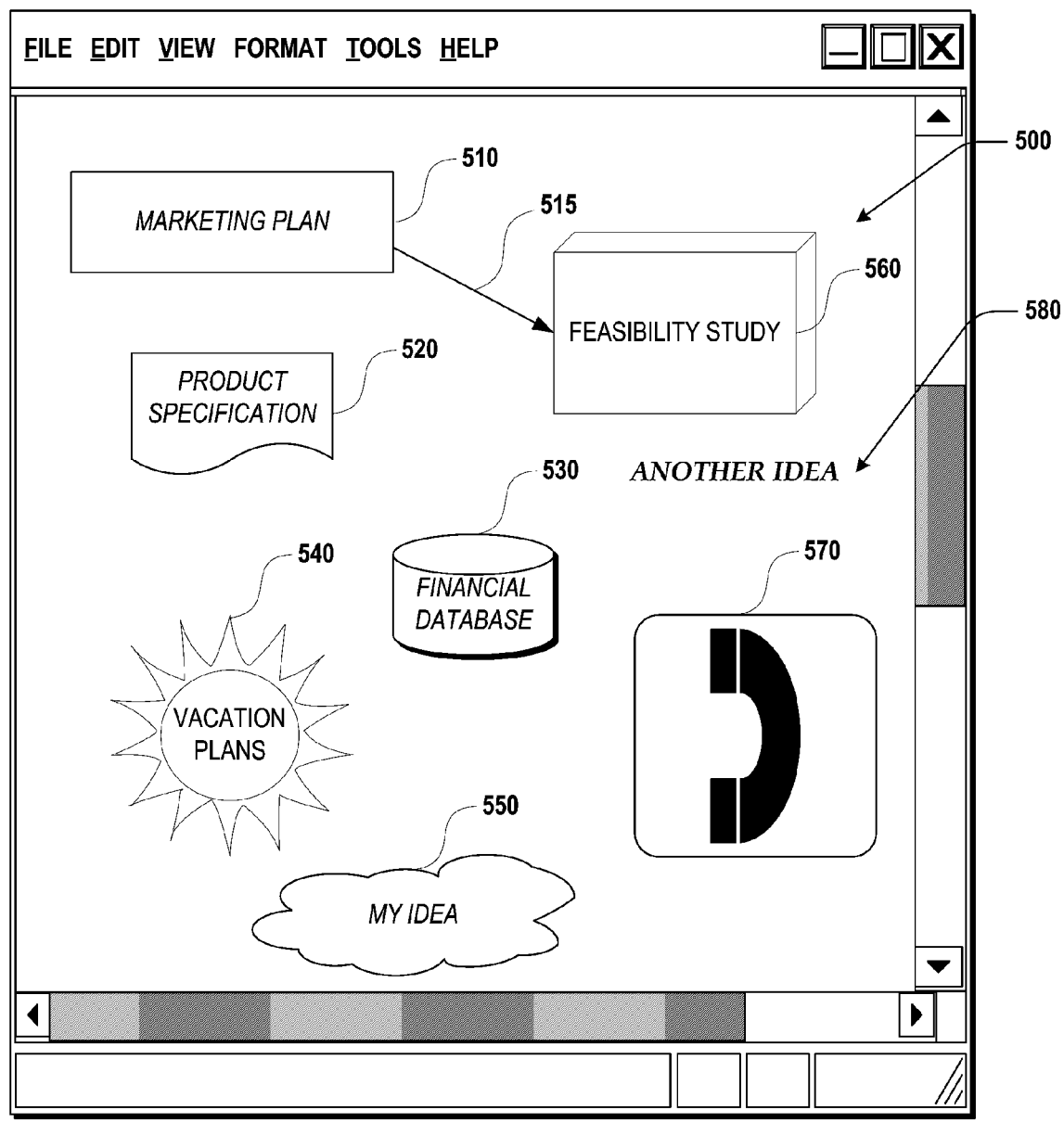

FIG. 5 illustrates several Ideas contained within a single two-dimensional Idea Page 500. In this example Idea Page 500:

"Marketing Plan" 510 is an example of an Idea consisting of two English words enclosed in a rectangular shape.

Arrow 515 is an example of an Idea expressed as a graphical shape (an arrow). This Idea connects "Marketing Plan" 510 and "Feasibility Study" 560.

"Feasibility Study" 560 is an example of an Idea enclosed in a three dimension block shape.

"Another Idea" 580 is an example of an Idea in plain text, without any discernible enclosing shape. It is also an example of an Idea whose meaning and/or value is determined, in part, by its proximity to "Feasibility Study" 560. "Another Idea" 580 could, in some embodiments, be interpreted as a comment on "Feasibility Study" 560.

"Phone" 570 is an example of an Idea having a seemingly arbitrary image.

"My Idea" 550 is an example of an Idea as a freeform drawing shape.

"Vacation Plans" 540 is an example of an Idea enclosed in an unusual geometric shape.

"Product Specification" 520 is an example of an Idea enclosed in a flowchart symbol.

"Financial Database" 530 is an example of an Idea having a symbolic shape.

Figure 6:
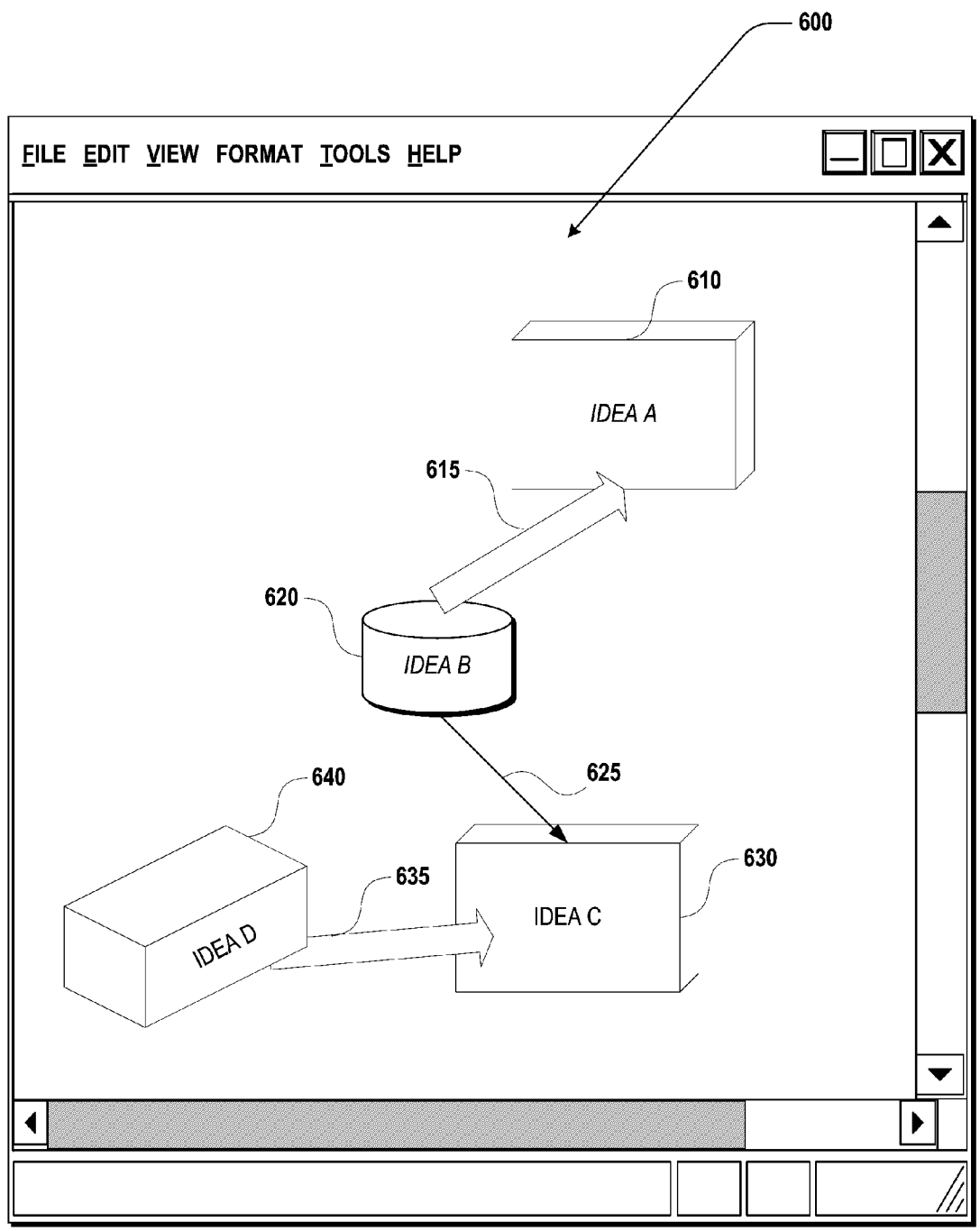
FIG. 6 illustrates an exemplary screenshot of a three dimensional Idea Page with associated Ideas in accordance with various embodiments.

Three-dimensional Idea Pages could be represented on two-dimensional display and printing devices using perspective or other display conventions, as illustrated in an example in FIG. 6.

FIG. 6 contains a number of Ideas A-D 610, 620, 630, 640 and connecting arrows 615, 625, 635. Note that some of the arrows and ideas overlap. In some embodiments, the layering of Ideas upon on other Ideas may convey additional information, such a relative importance or temporal information.

For example, in FIG. 6, Idea D 640 may have been created more recently than arrow 635, which in turn was more recently created than Idea C 630. In other embodiments, layering and/or placement of Ideas could convey yet other information.

Various Ideas may be "Simple" or "Complex," where, by definition, a Simple Idea does not contain any other Ideas within it, although it may have other objects such as files, bookmarks, e-mails, etc., associated with it. A Complex Idea could contain within itself, recursively, other Idea Pages, each of which may be Simple or Complex, as well as have other objects associated with it.

Figure 7:
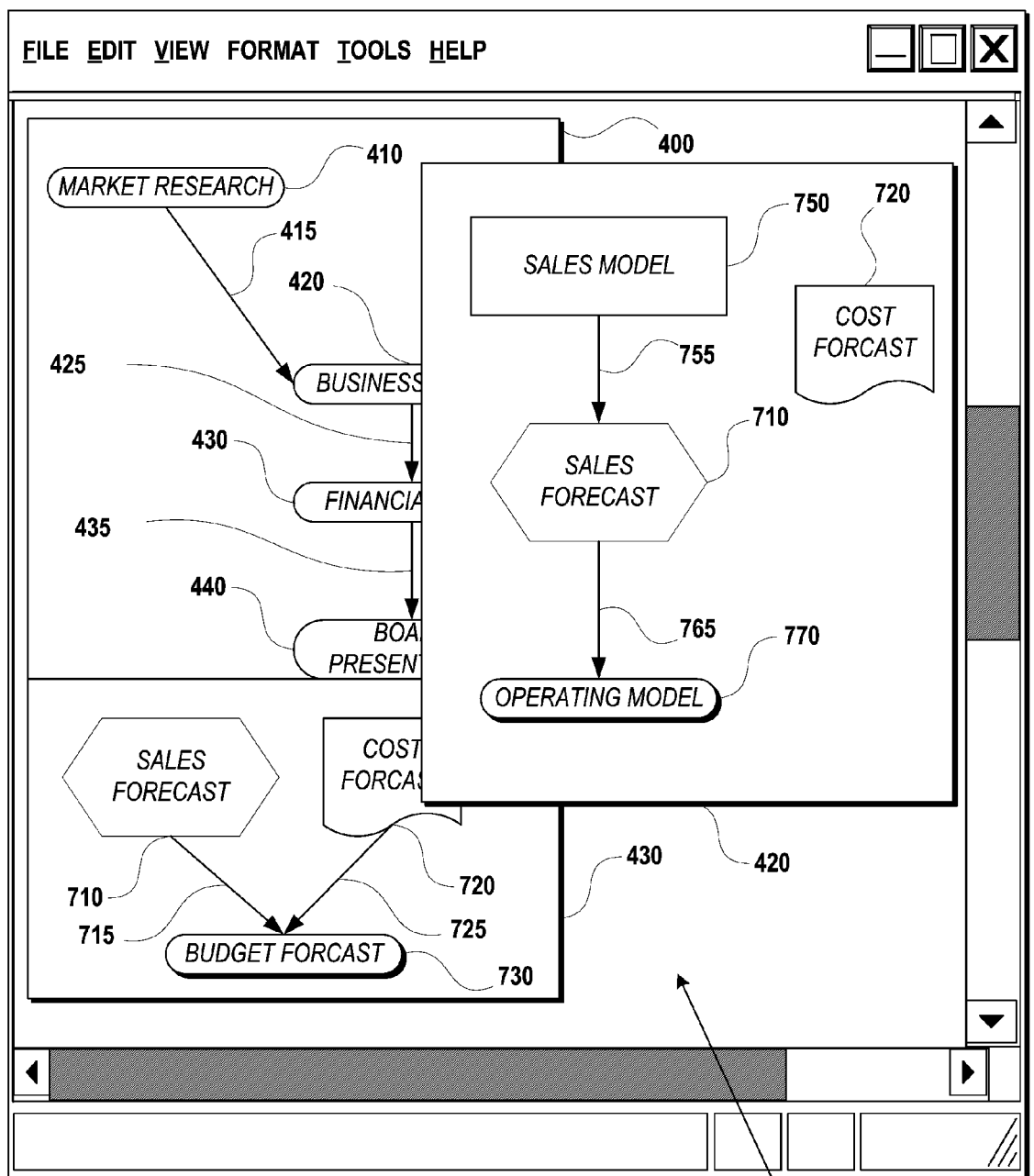
FIG. 7 illustrates an exemplary screenshot of Idea Pages with associated Ideas in accordance with various embodiments.

FIG. 7 illustrates an example where the "Business Model" 420 and "Financial Plan" 430 Ideas that were originally illustrated in FIG. 4 are assumed to be Complex Ideas, and their contents are shown overlaying the original Idea Page 400 from FIG. 4.

In addition to the "Startup" Idea page 400, FIG. 7 contains the exploded views of "Business Model" 420 and "Financial Plan" 430. The "Business Model" Idea Page 400 contains "Sales Model" 750, "Sales Forecast" 710, "Operating Model" 770 and "Cost Forecast" 720 Ideas along with connecting arrow Ideas 755 and 765.

The "Financial Plan" 430 Idea Page contains "Budget Forecast" Idea 730 and connecting arrow Ideas 715 and 725. "Financial Plan" 430 Idea Page also contains "Sales Forecast" 710, and "Cost Forecast" 720 Ideas. These Ideas have "Business Model" 420 and "Financial Plan" 430 as parents.

Any Idea, whether Simple or Complex, could exist on more than one Idea Page. In the example illustrated in FIG. 7, the "Sales Forecast" 710 and "Cost Forecast" 720 Ideas are shown existing simultaneously in the "Financial Plan" 430 and the "Business Model" 420 Idea Pages. The "Sales Forecast" 710 and "Cost Forecast" 720 Ideas are said to have two parents each, namely the "Financial Plan" 430 and the "Business Model" 420 Idea Pages.

When the same Idea or Ideas exists in more than one Idea Page, each Idea Page could represent a different, independent context or arrangement of the shared Ideas. Thus, in the example illustrated in FIG. 7, the "Sales Forecast" 710 Idea could appear in the "Business Model" 420 Idea Page as part of a process workflow involving the "Sales Model" 750 and "Operating Model" 770 Ideas; and it could also appear in the "Financial Plan" Idea Page 430 as part of a different, possibly entirely unrelated, context or process workflow that involves the "Budget Forecast" Idea 730.

Figure 8:
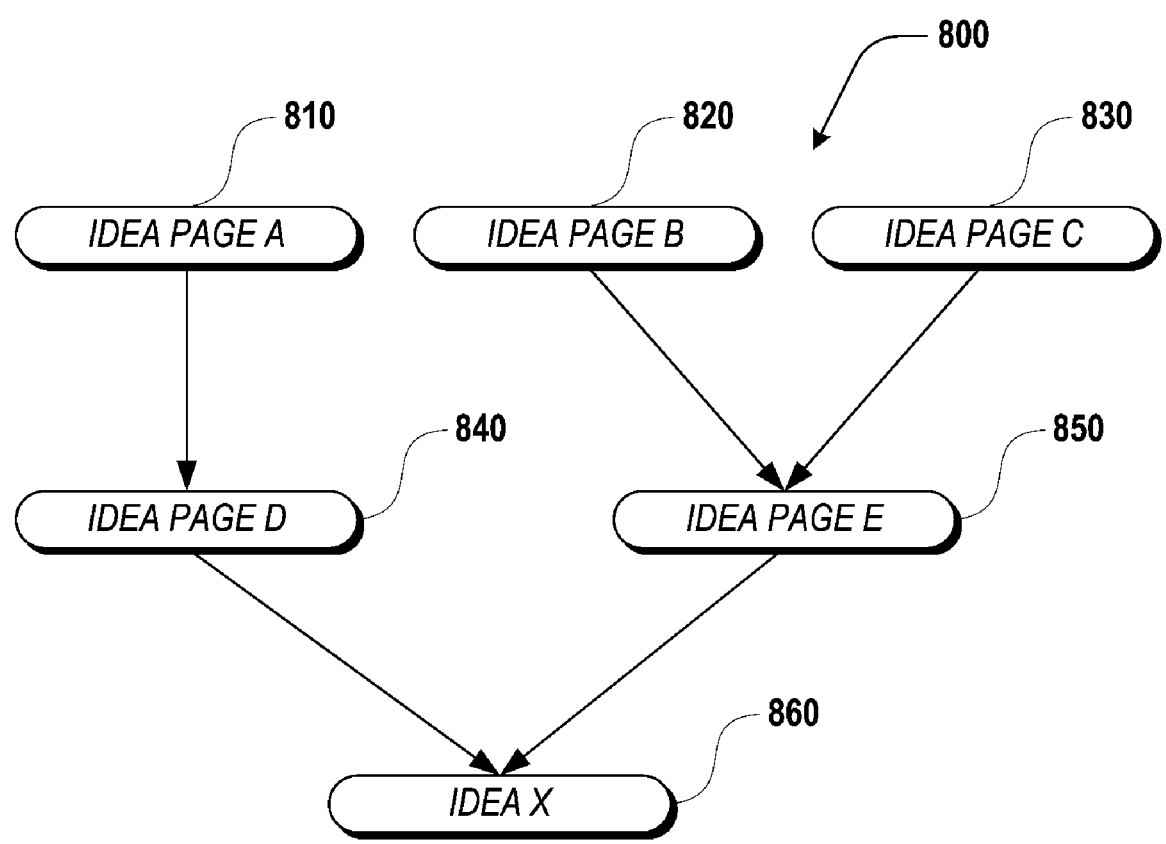
FIG. 8 illustrates an exemplary diagram of Idea parentage in accordance with various embodiments.

Whenever a user re-uses an Idea across multiple Idea Pages, the system 100 could keep track of all these Idea Pages and allow the user to know, at a glance, whether a particular Idea exists in more than one context (i.e., Idea Page). FIG. 8 illustrates this concept with an example: Idea X 860 appears on Idea Page D 840 and Idea Page E 850. Similarly, Idea Page E 850 appears on Idea Page B 820 and Idea Page C 830. Likewise, Idea Page D 840 appears on Idea Page A 810.

Every Idea has as many parents as the number of Idea Pages in which it exists; this implies that every Idea has at least one parent, since every Idea exists on at least one Idea Page. (Note: an Idea that has been deleted by the user may still remain in the system's data store, for example, it may be located in the system's Trash or Recycle Bin awaiting final disposal. In such circumstances, even the deleted Idea has a parent—the Trash or Recycle Bin (which may themselves be Ideas/idea Pages)—and this remains true until the Idea is finally removed altogether from the system 100.)

The chain of parents and ancestors may be known as "Back Links." The Idea Page system 100 could track, and display upon request, the Back Links of any Idea. If an Idea, or any its ancestor Idea Pages, has multiple parents, the IPUI 260 could show the various Back Link paths that exist. In the example illustrated in FIG. 8, the Back Links for "Idea X" 860 could include Idea Pages A-E 810-850.

In exemplary embodiments, each individual user is the root or ancestor of all Ideas and Idea Pages that he/she creates, and for every user, there is a so-called "Home Page" that acts as the top-level root of all Ideas that he/she creates. This is analogous to a disk drive of a computer acting as the root of the computer's file system.

In some embodiments, a user could have multiple, independent Home Pages: for example, a Personal Home Page that acts as the root of his/her personal activities and ideas, and a separate Work Home Page that acts as the root of his/her professional activities and ideas.

An Idea that exists in an Idea Page spawned by one Home Page could also exist in an Idea Page spawned by a different Home Page; this different Home Page could, potentially, be that of a different user of the system 100, even if the other user is not part of the same organization, located on the same computer network, or using a similar computer or operating system.

The user could associate a variety of digital content, tasks, issues, questions, meetings, actions, etc. around his/her Ideas and Idea Pages, organized in static or dynamic lists. All such items are referred to as "Associated Objects."

Digital content that is associated with an Idea or Idea Page could be static or dynamic. Examples of static content might include:

A file, such as a presentation, spreadsheet or memorandum.

An audio or video file.

A Web bookmark (i.e., a Uniform Resource Indicator or URI; also sometimes known as a Uniform Resource Locator or URL).

An e-mail.

Examples of dynamic content might include:

A Structured Query Language ("SQL") or other database or data store query that yields a different collection of files or data items each time the query is invoked or resolved.

A connection to a real-time system such as a statistics or usage tracking system.

A real-time data feed, such as a feed of stock market prices.

The Idea Page system 100 could support several mechanisms for associating digital content items with an Idea or Idea Page. Examples of such mechanisms might be:

Providing functions (e.g., buttons, dialog boxes, etc.) embedded within the IPUI 260 that allows the user to find a particular content item either by direct entry of a reference to the content item (e.g., a file name), by browsing through data stores of content (e.g., file or e-mail folders, and the like), or by executing queries to databases and real-time sources of data.

Allowing the user to drag a digital content item from the computer or electronic device's desktop, file system viewer or an external or third party application (e.g., e-mail client, Web browser, etc.) that supports drag-and-drop operations.

Allowing the user to drag indirect references to content, such as a URI or URL that is embedded within a content piece, or content items that are referenced or made addressable using meta tags or similar mechanisms, or search results from a desktop, Web based or other search engine (e.g., from Google, Inc. of Mountain View, Calif.; Microsoft Corporation of Redmond, Wash.).

Incorporating functions or buttons within external or third party applications software (e.g., Microsoft Word or Microsoft Excel from Microsoft Corporation, etc.) that support plug-ins and extensions. An example might be adding a button to Microsoft Word that automatically associates a particular document with an Idea or Idea Page.

Supporting rules-based importing of digital content items, in batch, continuous mode or real-time modes. Examples might be a system function that automatically finds and associates digital content items, such as all music associated with a particular performer, using wildcards of their file names, or a system function that automatically finds and associates files based upon their contents, e.g. by doing a search for a particular text string, keyword, or meta-tag.

In some embodiments, the Idea Page system 100 could support multiple ways of managing the associations between content items and Ideas/Idea Pages. One mechanism could be to maintain a symbolic link to a content item that is directly accessible, while another mechanism could be for the system 100 to maintain a private copy of the content item, which it uses for its own purposes. Using symbolic links may offer an advantage in not creating additional storage overhead through duplication of content items, while using private copies may offer an advantage in, at least partially, insulating the system's performance and integrity from actions taken external to the system 100, such as a user or program unexpectedly deleting or modifying a content item of interest.

Examples of the use of symbolic links could include:

Files available on the computer's file system or accessible through connected computers and disk drives through a LAN, WAN, VPN, Intranet, Extranet or the Internet.

E-mails stored as individual files.

E-mails stored in a proprietary format (e.g., Microsoft Corporation's Microsoft Outlook PST format) could also be managed as symbolic links if the e-mail vendor provides a published Application Programmer Interface ("API").

Examples of the use of private copies could include:

Web bookmarks ("URIs" or "URLs") can be treated as symbolic links, and therefore the system 100 could keep a private copy of URLs.

Database queries, expressed in industry-standard languages like SQL or in proprietary query languages or scripts, can also be treated as symbolic links and therefore the system 100 could keep a private copy of selected database queries.

Individual files could be copied into a private storage area in order to provide document management capabilities, as outlined below.

The Idea Page system 100 could allow the user to determine whether any individual content item, or a class of content items (e.g., all e-mails, all URLs, etc.), are associated with Ideas or Idea Pages using symbolic links or by making private copies; alternatively, such decisions could be vested within a set of defined users who are termed "administrators" of the system 100, and who are provided with supervisory or management privileges with respect to a defined community of users.

Other types of Associated Objects might include: tasks, open issues, questions, meetings, people, constraints, budgets, timekeeping records, activity statistics, etc. These could be organized in lists, and each Idea or Idea Page could have several, potentially overlapping lists associated with it.

Items in such lists could be entered directly by the user (e.g., by typing or scanning in a description of the item, etc.); they could be imported from other external or third-party applications (e.g., by importing a list of meetings from a calendar application, etc.); or they could be generated by the system 100 itself (e.g., a list of updates made by users to a particular Idea, etc.).

When the user selects an Idea or an Idea Page, the IPUI 260 could automatically show all its Associated Objects. There are several ways the system 100 could provide this facility, depending upon the computer or electronic device employed by the user to access the system 100.

Lists of Associated Objects could be managed as threads or structured outlines. An example is shown in FIG. 9, which deals with a set of tasks 950 that are associated with a specific Idea 900.

Figure 9:
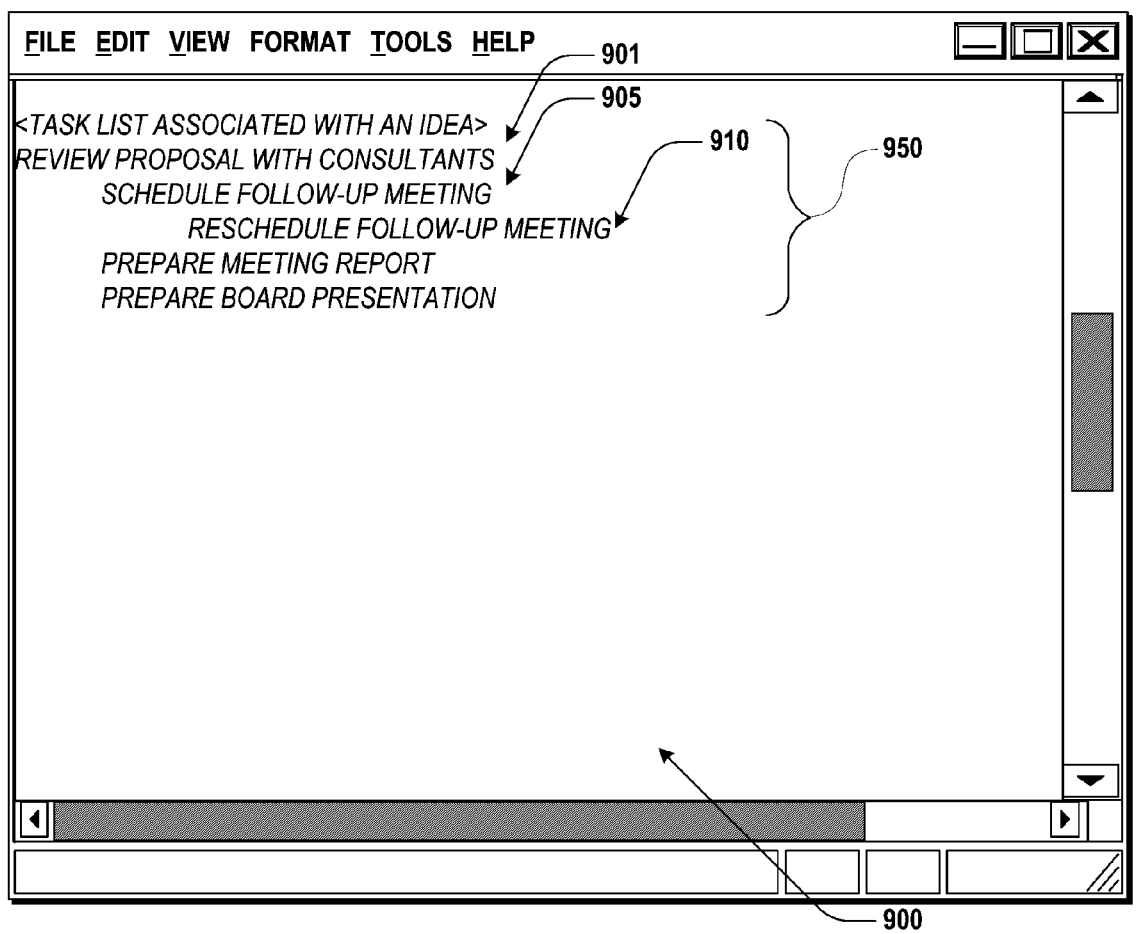
FIGS. 9-10 illustrate exemplary content associated with an Idea in accordance with various embodiments.

In the example illustrated in FIG. 9, "Reschedule follow-up meeting" 910 is indented within "Schedule follow-up meeting with consultants" 905, thereby indicating the former is a subordinate or follow-up item to the latter, which in turn is indented within "Review proposal with consultants" 901.

The outline structure of such lists could be managed and manipulated by allowing the user to promote or demote subordinate or follow-up: promoting an item could result in it being moved one position over to the left in the indenting schema shown in the example from FIG. 9, while demoting an item could result in it being moved one position over to the right. An example is illustrated in FIG. 10 where the item "Reschedule follow-up meeting" 910 has been promoted.

Figure 10:
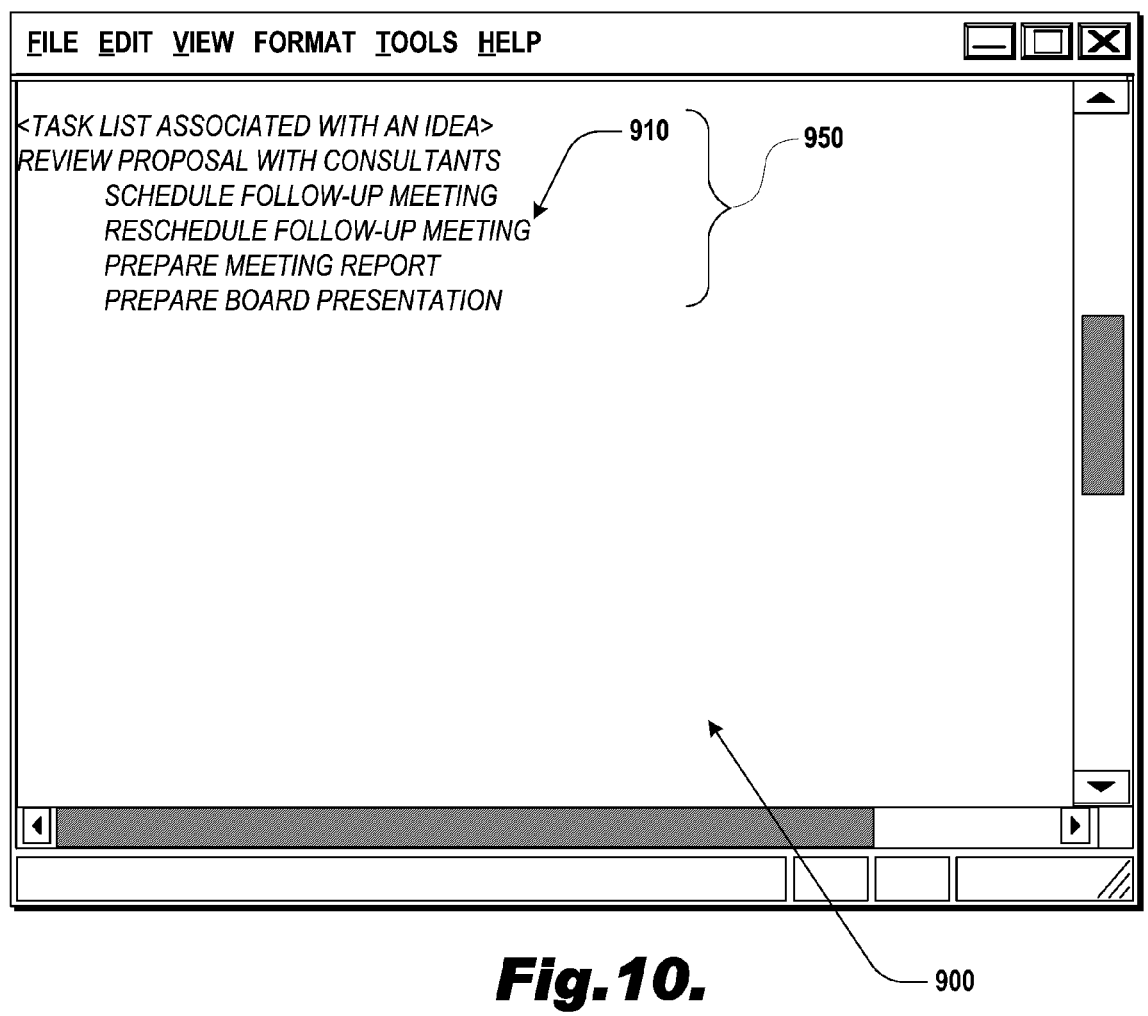

The concept of follow-up or subordinated items within structured outlines has been illustrated using an indented representation in the examples shown in FIG. 9 and FIG. 10; however, the IPUI 260 could adopt other styles and representations.

An Associated Object could be linked to multiple Ideas or Idea Pages: for example, the user could select an object associated with one particular Idea or Idea Page and then copy and paste (or Drag and Drop) this Associated Object so that it is associated with another Idea or Idea Page. Whenever an Associated Object is associated with more than one Idea or Idea Page, the system 100 could track all such associations and, optionally, provide an indicator to the user that a particular Associated Object has multiple parents.

The IPUI 260 could allow the user to select and "launch" an item (Associated Object) from a list of content associated with a particular Idea, if the user's computer or other electronic device has installed locally, or provides remote access to, the content-handling application 275 associated with the selected content item. For example, the IPUI 260 could permit the user to double-click with his/her mouse or other pointing device on a spreadsheet file within a content listing, and thereby launch a spreadsheet program such as Microsoft Corporation's Microsoft Excel if the user's current computer or other electronic device has Microsoft Excel installed locally or is configured to provide the user with remote access to this application software.

The content-handling application 275 could also, optionally, be integrated into the IPUI 260 itself: for example, the IPUI 260 could have embedded functionality that allows it to display files that use the Portable Document Format ("PDF"); in such cases, the PDF display could be within the confines of the IPUI 260 itself, rather than by means of an external application such as Adobe System Incorporated's (of San Jose, Calif.) Adobe Reader. Other examples might include the display of Hyper-Text Markup Language ("HTML") pages using an embedded browser or display of e-mail messages using an embedded e-mail client.

The IPUI 260 could allow the user to add a series of Notes to any Idea, Idea Page or Associated Object (known collectively as "Items"), where a Note could consist of a sequence of alphanumeric characters, graphics, audio and/or video. A Note could be of any size, in any language, and it optionally could be organized as sentences, paragraphs or pages of text.

Notes could be added by any authorized person with the appropriate permissions needed to modify the Item in question. The Notes need not modify the Item itself: for example, a Note that is added to a spreadsheet file need not appear in the spreadsheet itself. The system 100 could separately keep track of which Notes are attached to which Items. Whenever the IPUI 260 presents an Item to the user, all Notes that are attached to the Item could also be made available.

Ideas, Idea Pages and Associated Objects, known collectively as "Items," could have attributes, associated values or properties that are set manually by authorized persons, or automatically by the system 100. Examples of such values or attributes that may be helpful in project planning and management could include Priority, Completion Status, Due Date, Owner, etc. For example, a person could manually set the Priority of an Idea to High; the system 100 could automatically set the Completion Status of an Idea to Late or Due Soon based upon the current date and the Due Date, if specified, of the Idea.

Attributes of Ideas on the same Idea Page or other Idea Pages could affect each other. For example, two Ideas on the same or different Idea Pages could have a relationship defined between them such that if one Idea's Priority attribute value is set to High, the Priority of the other Idea is also automatically set to High. Where Associated Objects are organized in threaded lists, follow-up or subordinated items could have attribute settings that are independent of their parent items.

In some embodiments, Items have at least one Owner, which might be the user that first created, or imported, the Item into the system 100. Ownership of Items could be shared by several authorized users of the system 100 and ownership could be transferred from the original Owner to a new Owner, permanently or temporarily.

The Owner(s) of an Item could determine which other users (known as "Recipients") have access to the Item by creating an Access Control List ("ACL") for the item. An ACL could specify the Recipients of an Item, and the specific permission granted to each Recipient, thereby enabling users to individually or collectively develop and transform ideas into projects, create and execute project plans, create communities of interest and communities of purpose, explore ideas and issues, and create, maintain and manage distributed project teams. Examples of permissions could include:

- Ability to detect the presence or existence of an Item.
- Ability to find the Item by searching through the system 100.
- Ability to view the Item: its contents, attributes or display properties.
- Ability to modify the Item: its contents, attributes or display properties.
- Ability to attach new Items, such as adding new tasks to an Idea or adding a note to a task.
- Ability to delete the Item.
- Ability to create new Ideas that are contained within the original Idea, such as transforming a Simple Idea to a Complex Idea, or extending an existing Complex Idea.
- Ability to modify the ACL of the Item, such as adding new Recipients to the ACL, or to changing the permissions of any Recipient who is already on the ACL.

For Complex Ideas, these permissions could be restricted to just the parent Idea, or to some or all of the contained Ideas. Permissions could be inherited by Recipients: e.g. if a Recipient has a specified access to a Complex Idea, he/she could gain the same access to any new Ideas that are created within that Complex Idea. However, the system 100 could also be configured to require explicit authorization for every Recipient at every level of a Complex Idea.

The system could permit the Owner(s) of Items to set these permissions at any level of granularity and/or it could permit the user to create bundles of permissions that correspond to roles within a team or other natural categories and groupings of Recipients. For example, an Owner could create bundles of permissions that are presented as project team roles whereby a Recipient could have one of the following roles:

- "Observers," who could detect the presence of an Item, find the Item and view the Item.
- "Team Members," who have all the permissions of Observers, and in addition could modify an Item, attach new Items, and expand a Simple Idea into a Complex Idea.
- "Team Leaders," who have all the permissions of Team Members, and in addition could delete an Item and modify the ACL of the Item.

The system 100 could support any variety or combination of these or other roles.

Each Item has an original "context," which is defined as the original Idea or Idea Page where the Item was first created. Thereafter, the Item could be moved to other Ideas exist in several different contexts.

If an Item has one or more Recipients, each Recipient could be permitted to place his/her copy or version of the Item in new contexts that they create and manage. Placing an Item in new contexts, or sharing the Item with one or more Recipients, need not inherently or automatically modify the original Item. An example is illustrated in FIG. 11, which depicts the hypothetical "startup" Idea Page 400 on a Canvas 1100 that contains a total of 9 Ideas:

(1) "Market Research" 410;
(2) "Competitive Analysis" 450;
(3) "Business Model" 420;
(4) "Financial Model" 430;
(5) "Board Presentation" 440;
(6) Arrow linking "Market Research" and "Business Model" 415;
(7) Arrow linking "Competitive Analysis" and "Business Model" 445;
(8) Arrow linking "Business Model" and "Financial Plan" 425; and
(9) Arrow linking "Financial Plan" and "Board Presentation" 435.

Figure 11:
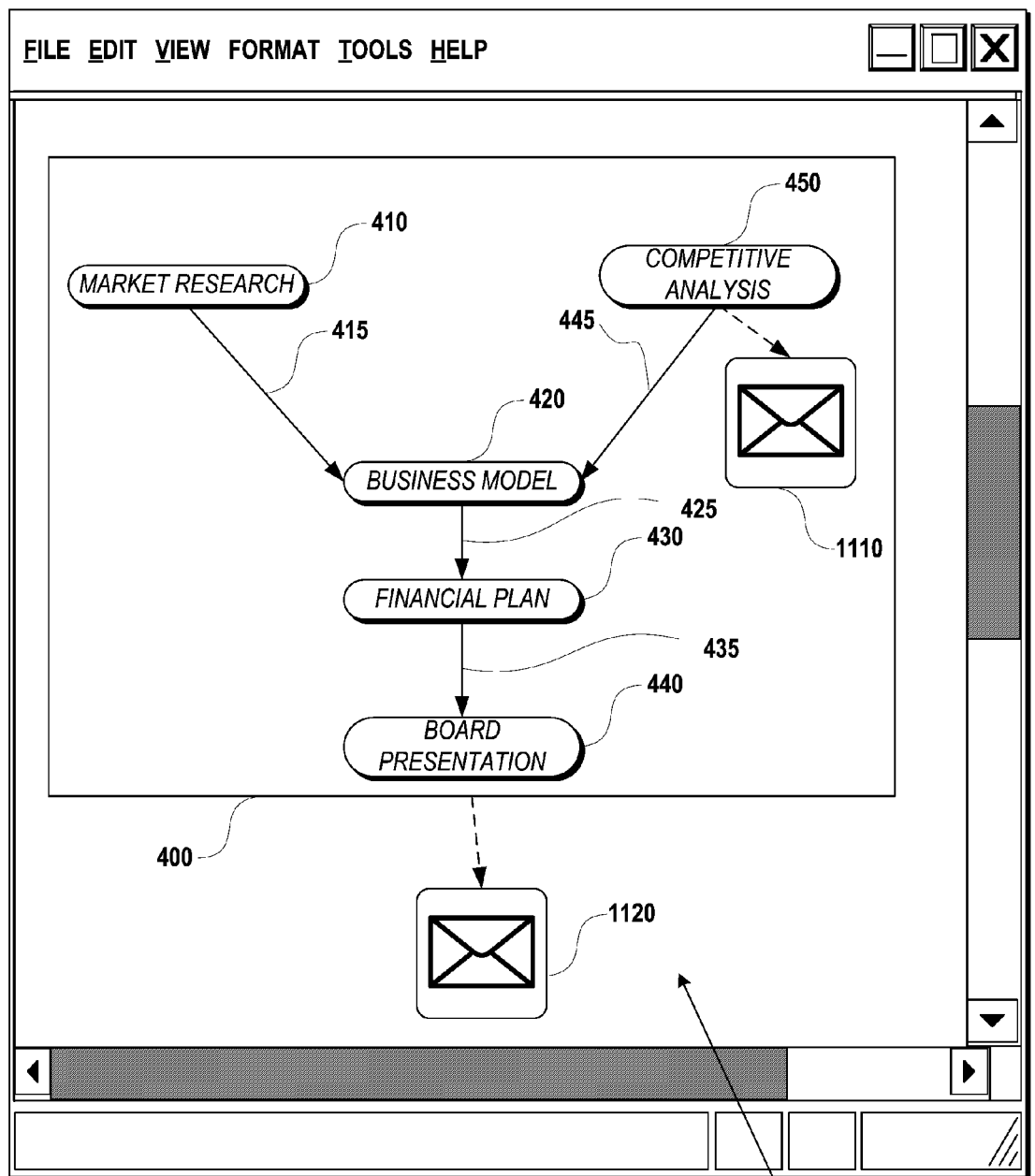
FIGS. 11-15 illustrate exemplary screenshots of Idea Pages and associated content in accordance with various embodiments.

FIG. 11 illustrates an exemplary Idea Page where the "Competitive Analysis" Idea has a document (Associated Object) attached to it called "Doc X" 110 and the "Startup" Idea Page 400 has a document attached to it called "Doc Y" 1120. Note, that the arrows connecting to the Associated Objects 1110, 1120 are not necessarily Ideas. In some embodiments, Associated Objects may simply be owned by or associated with an Idea. Of course, in some other embodiments, Ideas are not necessarily associated with other Ideas by way of arrow Ideas either.

There are several ways in which the Owner of this hypothetical Idea Page (say, "User A") could share these Items with other users:

- User A could share the entire Idea Page: all nine Ideas 410-450 and the two documents 110-1120, where each Item has a different ACL.
- User A could share just some of the Ideas, but not the documents.

User A could share one or both documents, but not any of the Ideas.

Figure 12:
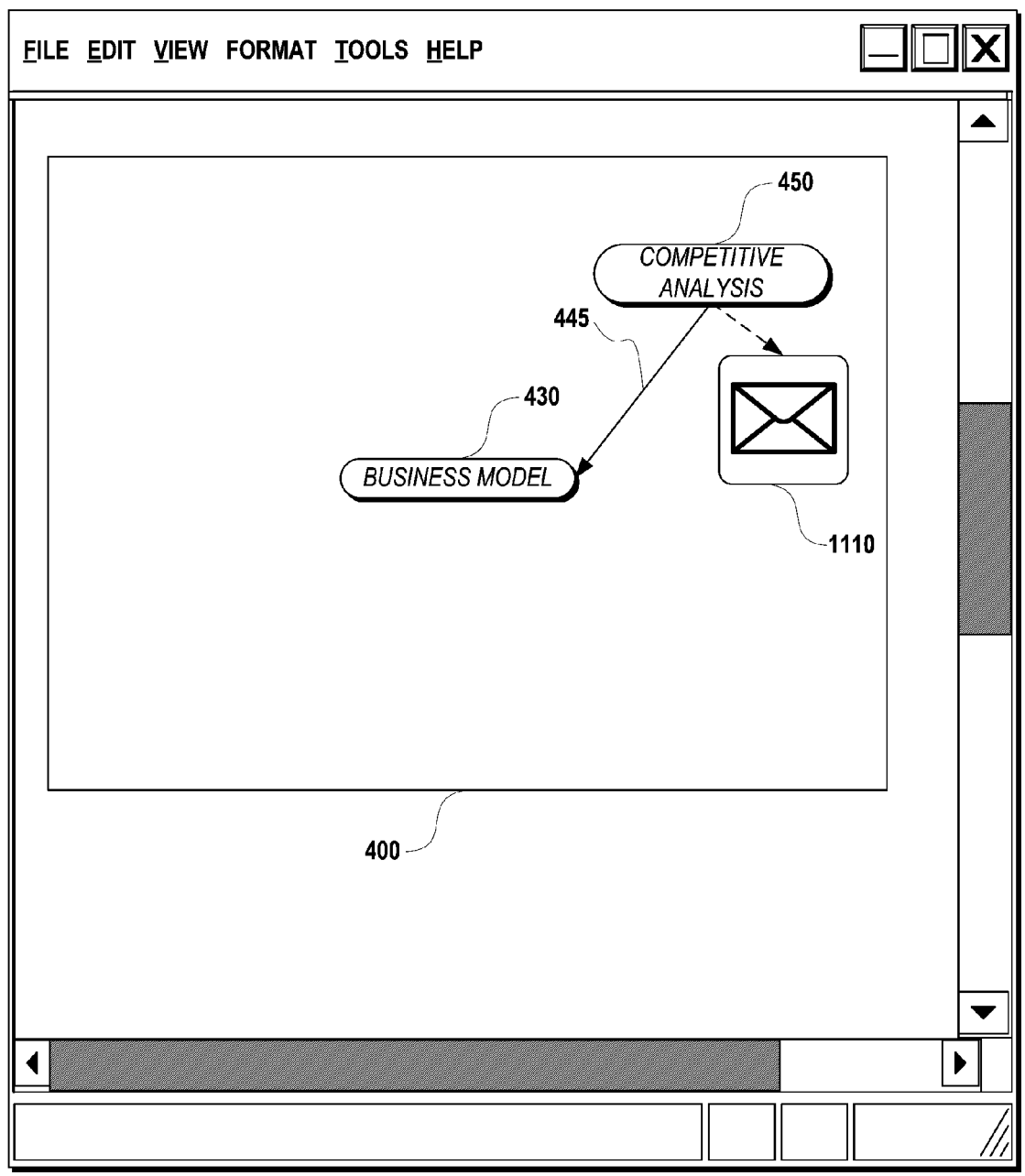

In a scenario whereby User A adds User B to the ACLs of "Competitive Analysis" 450, "Doc X" 1110 and "Business Model" 420 (and their connecting arrow 425), User B would get partial access to the "Startup" Idea Page 400, as illustrated in FIG. 12. As FIG. 12 shows, User B's view of the "Startup" Idea Page 400 could be restricted to only those Items where he/she is on the ACL: User B might have no inkling that any other Items even exist on the Startup Idea Page 400.

Figure 13:
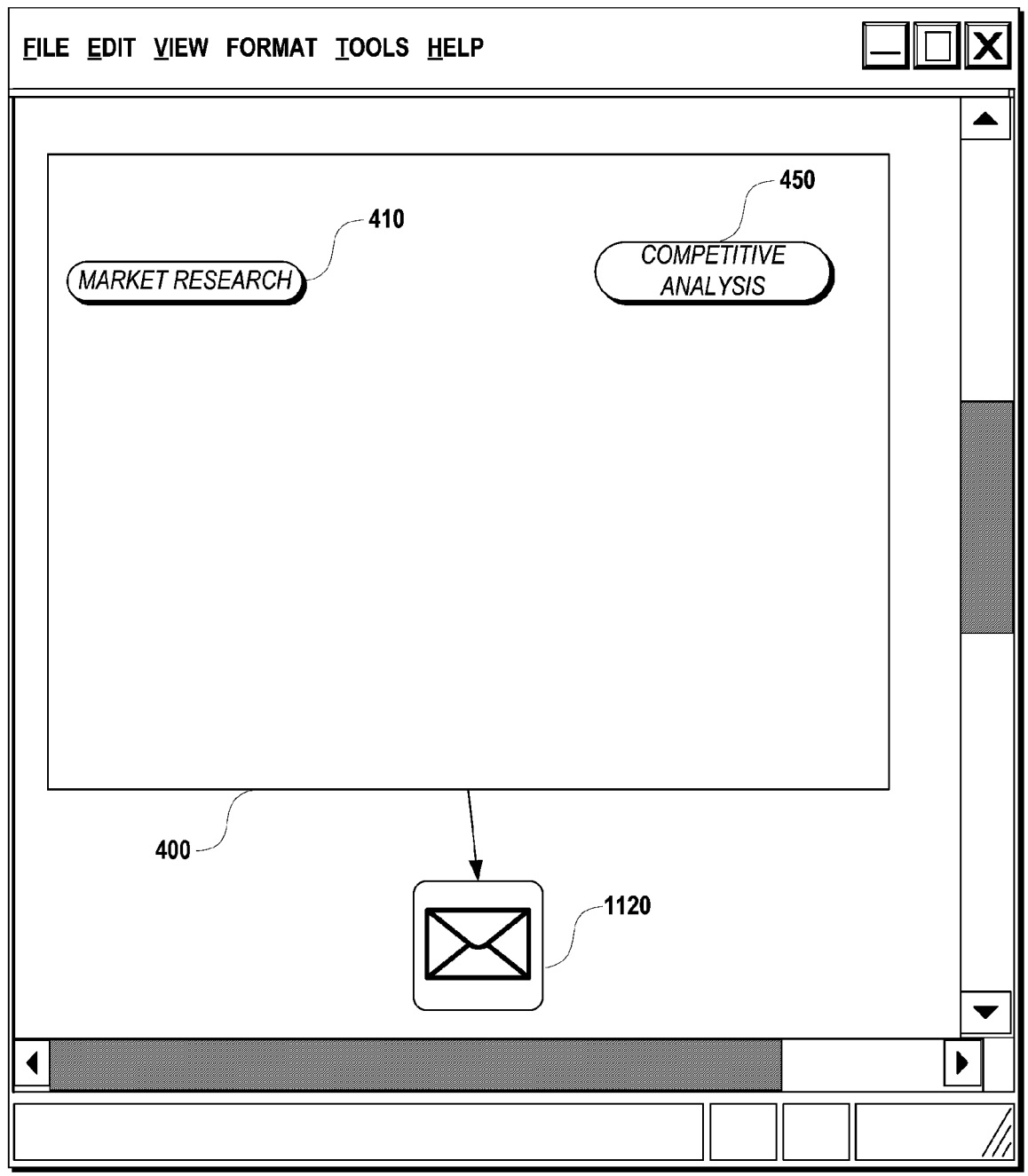
Figure 14:
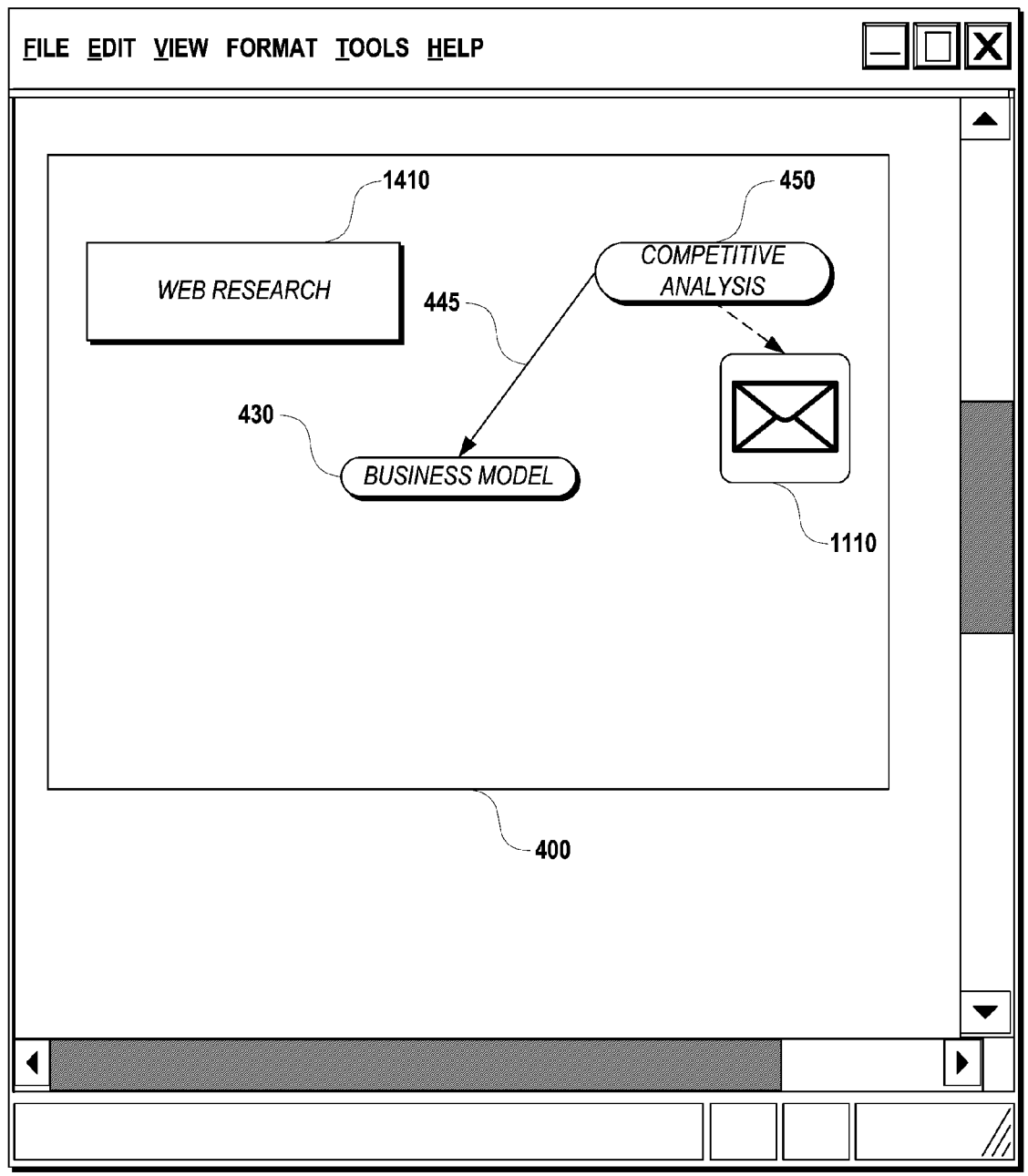

Simultaneously, User A could share some of these Items with yet another user: User C, for example. This is illustrated in FIG. 13, where User C is given access to "Market Research" 410, "Competitive Analysis" 450 and "Doc Y" 1120.

In some embodiments, when a user becomes a Recipient of an Item for the first time, there may be no natural or obvious context from the perspective of the Recipient wherein this Item should be placed. One way in which the IPUI 260 could handle this issue is by creating a System Inbox (not shown) that is analogous to the Inbox folder available through most e-mail clients.

The System Inbox could be implemented as an Idea Page, or as a simple list. Items could stay in the System Inbox until they are moved to other Idea Pages by their Recipients. The Recipient does not have to move Items from his/her Inbox in order to deal with them. As these Items are updated by their Owner(s) or by other Recipients, the system 100 will provide updated copies of the Items to the System Inbox.

When a Recipient receives an Item from its Owner(s), the IPUI 260 could provide graphical and display information (e.g., the shape and color of an Idea) along with all other relevant control information and data.

When a user becomes a Recipient of a set of related Items, e.g. a number of Ideas and Associated Objects that are related to the same Idea Page, the IPUI 260 could provide a consolidated view of these related Items. For example, by including the Ideas within a parent context.

Additionally, it may be possible for users to create filters or processing rules that could automatically process new Items that they receive based upon criteria such as the identity of the Owner, the title of the Item, etc. This could be analogous to creating e-mail filters that automatically file new incoming e-mails in specified folders.

It could be possible for an Owner to share an Associated Object, such as a document, without sharing the Idea or Idea Page to which the document is attached.

Figure 15:
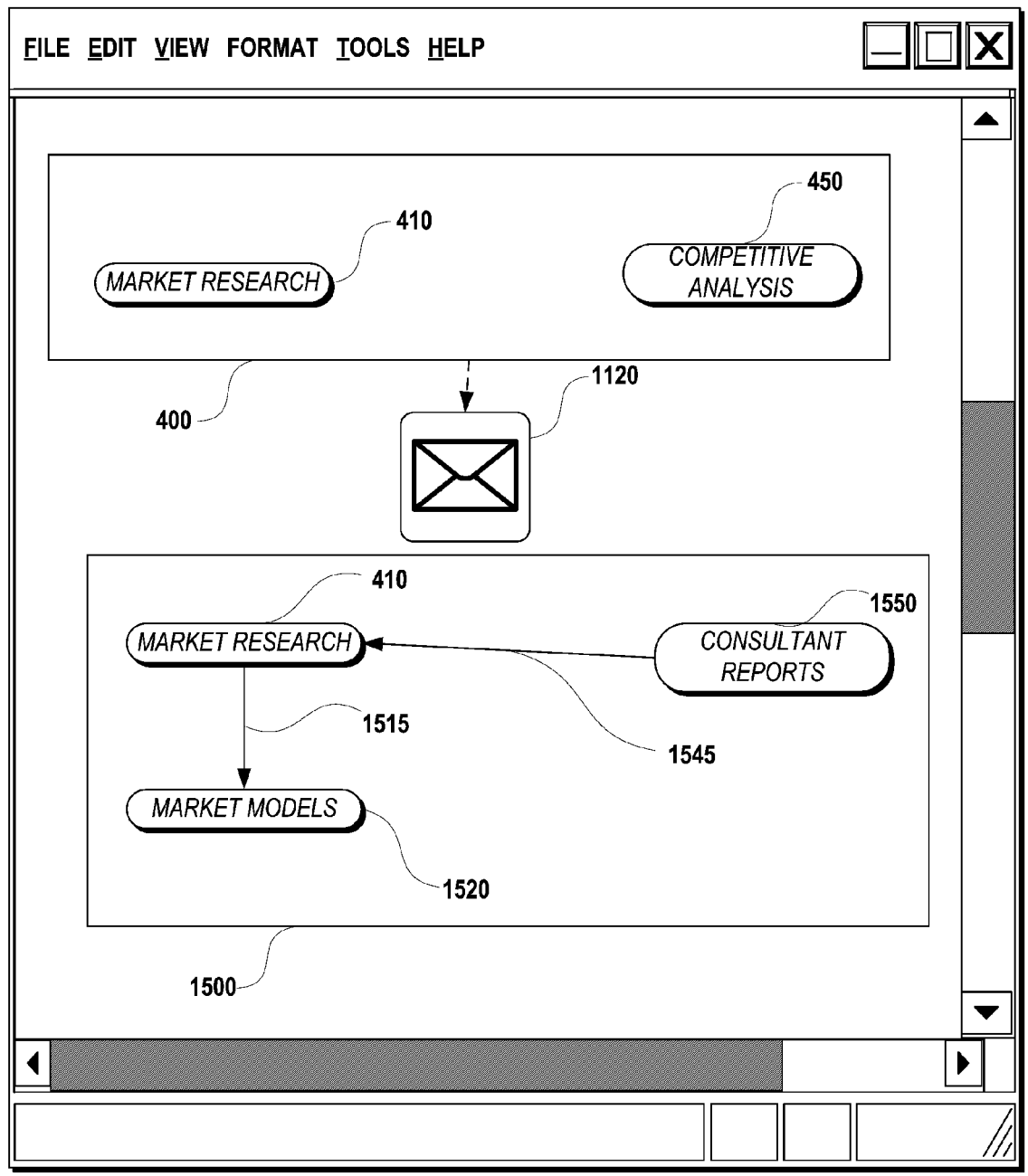

The Owner could, at any time and as often as desired, add new users to the ACL of any Item, remove users, or modify permissions of individual users. In the example illustrated in FIG. 12, for example, the owner of the "Startup" Idea Page might decide subsequently to make User B a Recipient of the "Market Research" 410 Idea as well (not shown).

Where two Idea shapes (e.g., an ellipse and a rectangle) are linked by means of a third Idea shape (e.g., an arrow), the links are normally preserved in the process of sharing Ideas between Owners and Recipients. Since the links themselves are Ideas, it could be possible for a Recipient with appropriate permissions to create new links between shared Ideas, or to modify or remove existing links. In the example illustrated in FIG. 13, User B could be permitted to create new Ideas on the "Startup" Idea Page 400 and link these new Ideas to the ones that he/she received from the original Owner(s) of the Page. This is illustrated in FIG. 15, where User B has created a new Idea called "Web Research" 1410 that he/she has linked (via Idea 1405) to "Competitive Analysis" 450.

When a user who is a Recipient of an Idea links this Idea to new Ideas of his/her own, he/she need not share these new Ideas with the Owner(s) of the original Idea. In the example illustrated in FIG. 15, if User B creates the "Web Research" Idea 1410 on his/her copy or view of the "Startup" Idea Page 400, he/she need not be required to make this "Web Research" Idea 1410 available to the original Owner(s) of the "Startup" Idea Page, or to any other Recipients of the "Startup" Idea Page. It could be possible for User B to create the "Web Research" Idea 1410 as a purely private Idea—i.e. one that is only accessible to User B. This is termed a "private extension to a shared Idea Page."

Private extensions to shared Idea Pages could provide privacy for project team members, by enabling them to view a shared set of Ideas (e.g., a common project or initiative) in a personalized way. Recipients with appropriate permissions need not be restricted to a single view of any Idea or Idea Page—instead, they could extend and expand these Ideas independently of the manner in which the shared Ideas are viewed or modified by the original Owner(s) or other Recipients.

A Recipient with limited rights (e.g., one with only an Observer role in the project) may not be able to create any private extensions to the shared Idea Page: he/she may be restricted to the view that is generated by the Owner(s) of the Page, or by other Recipients of the Page who have more permissive rights to the Page.

Figure 16:
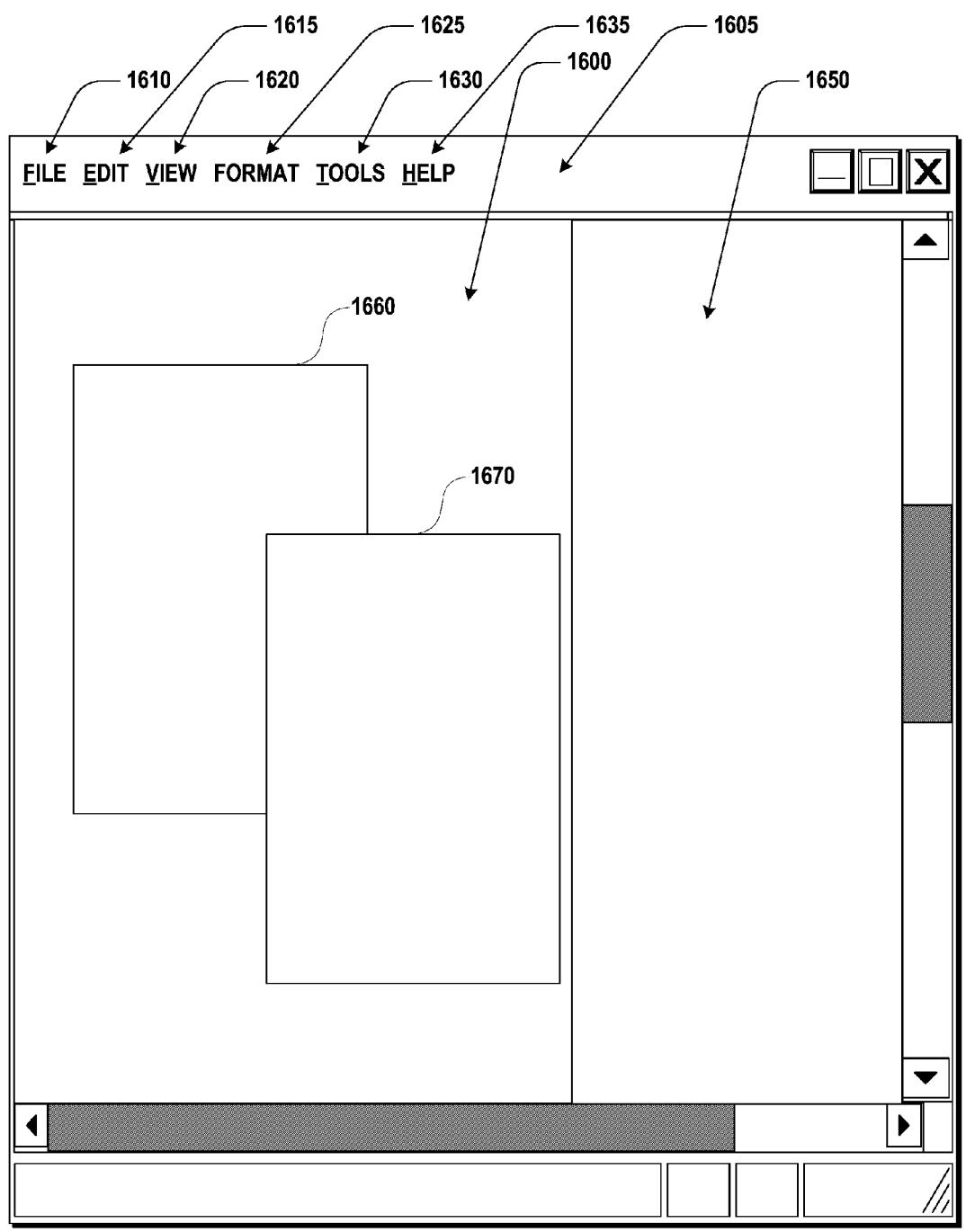
FIG. 16 illustrates an exemplary user interface for presenting Ideas in accordance with various embodiments.

Recipients could also repurpose Items provided to them by other users, by linking these Items to other Idea Pages created by the Recipients. This could be done, for example, by copying the Items from the System Inbox, or wherever else the Items currently exist, and pasting them onto new Idea Pages created by the Recipients. This is illustrated in FIG. 15, which takes up the example shown in FIG. 13 where User C gains access to the "Market Research" Idea 410 as part of a set of Items related to the "Startup" Idea Page 400 for which he/she became a Recipient. FIG. 16 illustrates a scenario wherein User C repurposes the "Market Research" Idea 410 in a new Idea Page called "R&D" 1500 that he/she has created. The example "R&D" Idea Page 1500 also contains the "Consultant Reports" 1550 and "Market Models" 1520 Ideas, along with arrow Ideas 1545 and 1515.

The IPUI 260 (in conjunction with other elements, such as the Idea Page Engine 265) could automatically synchronize changes to the shared Items, where such changes were made manually or automatically by the Owner(s) and/or Recipients, and where such changes were made automatically by the system 100 itself. An example of a change made by the system 100 itself might be to mark an Item as "Late", if a Due Date attribute for the Item has passed without the Item being marked as Complete by the Owner(s) or Recipients.

Normally the ACL for an Item might include only those people who have access to the system 100, so that these Recipients might access, manipulate or manage shared Items. However, it could be possible to configure the system 100 such that the ACL includes people without access to (or outside) the system 100. There are several ways in which people or even systems (hardware or software) could be configured to act as so-called "Passive Recipients" to an Item, even when these people or systems are not in a position to directly access, manipulate or manage the Item.

For example, a person who is not an authorized user of the system 100, but is nevertheless part of the ACL of an Item, could be automatically sent updates to the Item by the system whenever the Item is changed by its Owner(s) or Recipients. The updates could be sent through a variety of electronic mechanisms, such as fax, e-mail, etc., and in a variety of formats and forms such as by creating a HTML or graphic image of a Page, etc.

In another example, an external or third-party software or hardware system (e.g., a database, a Web site etc.) could also be set up as a Passive Recipient for any Item. These external systems could receive updates to Items sent in a variety of proprietary or industry-standard formats. One example might be to allow users of the system to automatically update a Web site with updates of their Ideas, Idea Pages and Associated Objects, so that they can publish their work updates to an Intranet, Extranet or the Internet.

When a shared Item is modified or updated, the system 100 could automatically send a notification to all users on the Item's ACL. The notifications could, optionally, be segregated by the user so that all updates to Idea Pages, for example, are listed together; all updates to content items are listed together, etc.

One exemplary implementation of the system 100 described above could be for use on a computer with a mouse or other pointing device, for example a personal computer running Microsoft Corporation's Microsoft Windows operating system or the open-source Linux operating system, in which case the system could have a GUI (e.g., IPUI 260) similar to that illustrated in FIG. 16.

The example GUI illustrated in FIG. 16 could include the following major components:

Menu Bar: The Menu Bar 1605 could contain common application functions, organized into groups of drop-down menus such as:

File 1610: this group could include functions for creating and saving templates, for creating and saving archives of Idea Pages, opening or closing a particular Idea Page, printing Idea Pages, accessing a list of recently-used Idea Pages, etc.

Edit 1615: this group could include functions for cutting or copying an Item, deleting an Item, pasting an Item, undoing recent actions, redoing recent actions, creating filtered views of the Workspace or the Details Sidebar, etc.

View 1620: this group could contain functions such as creating filtered views in the Workspace (e.g., "show most frequently updated Idea Pages", etc.) or the Details Sidebar (e.g., "show only spreadsheets related to this Idea", etc.)

Format 1625: this group could include functions for formatting Items such as setting their display properties (e.g., colors, fonts, etc.).

Tools 1630: this group could include functions for searching for particular Items, checking spelling or grammar, managing relationships with other users, managing or overseeing usage of the system 100 (e.g., statistics, bandwidth consumption, etc.), managing security (e.g., encryption, authentication, etc.), customizing the "look and feel" of the system 100, managing versions of Items, etc.

Help 1635: this group could contain functions for accessing help on individual features of the system 100, proving an overall introduction to the system 100, tutorials, knowledge bases, etc.

Various other combinations of functions could be created to accommodate different user interface or operating system standards and guidelines, or to accommodate different market or user requirements.

The GUI could also contain other components, such as the canvas 1600, Idea Pages 1660, 1670 and a Sidebar 1650.

Optionally, the GUI might also contain a "Tool Bar" (not shown). The Tool Bar could contain buttons, with or without accompanying labels, and with or without accompanying pop-up text commonly known as "tooltips", for functions such as:

Navigation: navigating between a set of linked Idea Pages could be made similar to navigating Web pages using a browser, by modeling the GUI's navigation function on that of a Web browser with "Back", "Forward" and "Home" buttons.

Creating new Ideas and Idea Pages: the Tool Bar could contain buttons for creating new Ideas, which could be enclosed in a variety of shapes (e.g., rectangles, ellipses, etc.); freehand drawings created using a mouse, tablet or other pointing device; scanned images; images imported from internal or external or third-party libraries of graphical images; etc. These buttons could also include functions that draw a variety of lines (e.g., straight, curved, etc.).

Formatting existing Ideas and Idea Pages: the Tool Bar could contain buttons that enable the user to modify the appearance of an Idea or Idea Page, such as by manipulating font size, font color, etc. These buttons could bring up dialog boxes or other interactive displays that enable the user to change the appearance of an Idea or Idea Page, as well as apply formatting styles using templates or other standards.

Editing operations: the Tool Bar could include buttons that support deleting, copying, cutting or pasting items from the Workspace or the Details Sidebar.

Other operations: the Tool Bar could include a variety of other buttons that map, for example, onto functions that are also available from the Menu Bar, such as creating or opening a template.

Workspace: the Workspace (Canvas) 1600 could be the main display area for the IPUI 260. It could provide one or more scrollable canvases for users to create, manipulate, view and manage their Ideas and Idea Pages. Using drawing tools available from the Tool Bar (as described above), the user could place Ideas on the Workspace canvases. The following example, based upon a scenario where the user has access to a computer with a monitor and mouse or other pointing device, illustrates the process by which a user could create an Idea Page similar to the one depicted in FIG. 4.

The user could select an ellipse shape from the Tool Bar using his/her mouse or other pointing device. The cursor displayed on the screen could change to confirm the user's selection of the ellipse shape by, for example, changing to an ellipse-shaped cursor.

Using this cursor, the user could click somewhere on a canvas to create a shape on the canvas corresponding to the shape selected by the user from the Tool Bar (i.e., an ellipse, in this example). The user could then begin to type in any set of characters to capture his/her Idea. For example, the user could type in "Market Research" as the first Idea on the canvas in order to create an Idea Page similar to the one depicted in FIG. 4.

Similarly, the user could place additional shapes on a canvas, each containing a separate Idea (i.e., "Competitive Analysis", "Business Model", etc., as in the example illustrated in FIG. 4). This process could include selecting a line drawing tool from the Tool Bar to draw lines connecting the ellipses on the canvas, and the process could continue until the Idea Page looks like the one depicted in FIG. 4. The lines themselves could be treated as Ideas by the system 100, or merely as graphical artifacts that connect shapes on the canvas.

Having created the basic framework of Ideas, the user could then format an Idea Page by, for example, adjusting the color, style and thickness of the lines connecting the various shapes. This could be done using tools from the Tool Bar or by selecting one or more items on the Idea Page and then apply the appropriate command from the Format menu on the Menu Bar.

The user could also grab an Idea on an Idea Page, using a mouse or other pointing device, and move it about on the scrollable canvas in order to manage the overall appearance and layout of the Idea Page, or move it onto another canvas in order to effect a cut-and-paste of an Idea from one Idea Page to another. Similarly the user could employ a combination of keyboard and/or mouse actions, such as simultaneously using the Ctrl key and a mouse action for example, to copy an Idea from one Idea Page to another.

The next step for the user might be to organize some content around these Ideas. One such scenario might be for the user to find Web pages of interest to one or more of the Ideas on the Idea Page and then to link these pages to the Ideas. This could be done in a variety of ways: if the user's computer operating system and Web browser support drag-and-drop interactions between applications, the user could drag Web links (URLs) and drop them over or onto one of the Ideas the canvas, and this could signal the system 100 to maintain a symbolic link between the selected Idea and the selected URL. Alternatively, the IPUI 260 could present an input window or other interactive dialog that allows the user to specify the path name of a file, a URL, an e-mail, a database query, or a query or invocation of any external system containing any mix of static or dynamic data.

If individual e-mails are not easily accessible as individual files, the system 100 could incorporate a programmatic interface to one or more external or third-party e-mail clients, using industry-standard protocols and methods or proprietary API interfaces.

The process of associating content items with Ideas could be repeated as often as desired by the user, at any time during the existence of the Idea Page.

Similarly, the IPUI 260 could provide an input window or other interactive dialog that enables the user to create lists of tasks, issues, queries, meetings, work assignments, etc. that are associated with one or more Ideas or Idea Pages. For example, the IPUI 260 could enable the user to select one or more Ideas and/or Idea Pages and then present an input window or dialog box which enables the user to manually type in a task; this process could then associate the task with the selected Ideas and/or Idea Pages.

Similarly, the IPUI 260 could provide an input window or other interactive dialog that enables the user to create lists of people that are associated with one or more Ideas or Idea Pages. For example, the IPUI 260 could enable the user to select one or more Ideas and/or Idea Pages and then present an input window or dialog box which enables the user to manually type in another user's name or other identifying information; this process could then associate the person with the selected Ideas and/or Idea Pages.

When a person is associated with an Idea or Idea Page, this person becomes a Recipient of that Idea or Idea Page. The IPUI 260 could present an interactive dialog, for example, that enables the user to determine the specific access permissions and rights that a particular Recipient is to have with respect to a particular Idea or Idea Page. This dialog could, for example, allow the user to see at a glance all the Recipients that exist for a particular Idea or Idea Page, as well as view and/or change each Recipient's permissions or roles with respect to the Idea or Idea Page.

If the user wished to elaborate upon any of the Ideas on an Idea Page, i.e. transform a Simple Idea to a Complex one, he/she could select the Idea in question and create a new scrollable canvas that represents the contents of the Idea.

This could be accomplished in several ways. If, for example, the user is accessing the system 100 with a computer and a pointing device such as a mouse, he/she could double-click an Idea currently displayed in a Workspace canvas using the mouse. Another mechanism could be for the user to select an Idea and then create a new canvas for this Idea by selecting an appropriate command from the "File" menu in the Menu Bar.

This second canvas could partially or entirely overlap the first canvas, or it could replace the first canvas so that the Workspace shows only the new canvas, or the Workspace could show simultaneously show both canvases as in the example illustrated in FIG. 7. Other alternative display schemes are possible, such as allowing the user to simultaneously access a number of different canvases and/or a number of displays 240.

When Complex Ideas are shown on a Workspace canvas, they could, optionally, have an icon, indicator, highlighting or other graphical artifact or styling applied or attached to it by the IPUI 260; this could help the user understand at a glance which Ideas, if any, on an Idea Page are Complex.

The user could select an Idea and cut or make a copy of it for use on another Idea Page using the Edit menu group from the Menu Bar 1605.

The top of a Workspace canvas could display the "Back Links" for the Idea or Idea Page that is currently selected in the canvas. For example, when viewing the "Business Model" Idea Page 420 illustrated in FIG. 7, a portion of the canvas 700 could display the following sequence (not shown), assuming the original set of Ideas was placed directly onto the user's Home Page: "Home>Business Model."

To continue this example, if the original set of Ideas had been placed within a Complex Idea called "Startup Plans" (not shown) located on the user's Home Page, the Back Links shown when the user is viewing the "Business Model" Idea Page could display the following sequence instead: "Home>Startup Plans>Business Model."

The Back Links could be displayed in other ways as well, e.g. with greater use of graphical artifacts, and the Back Links could be placed elsewhere within the Workspace or on any other window or display area within the IPUI 260.

Figure 17:
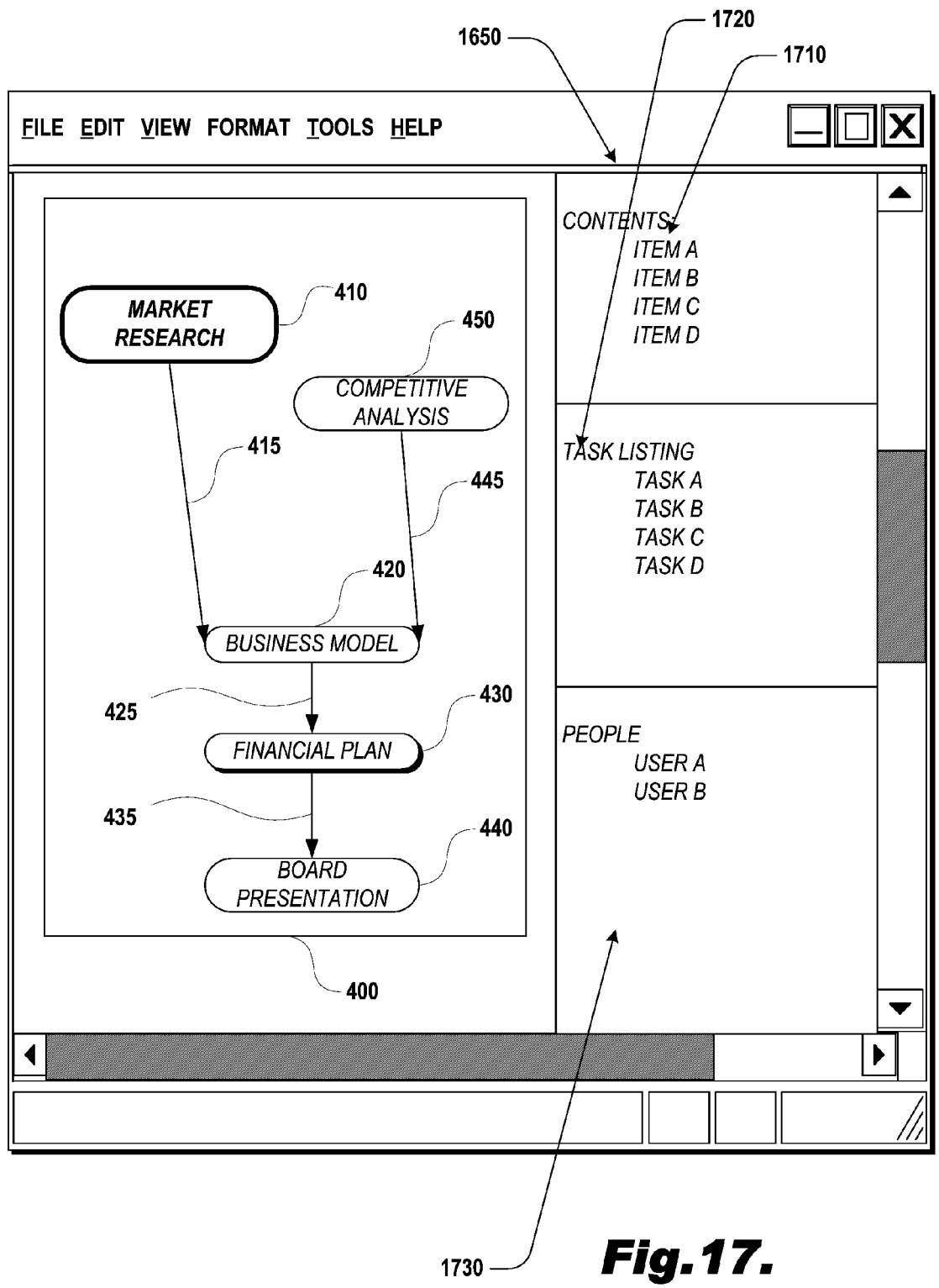
FIGS. 17-20 illustrate exemplary user interface layouts for displaying Ideas and associated content in accordance with various embodiments.

Details Sidebar: The Details Sidebar 1650 could be organized so as to contain within it several Panes 1710-1730 or "mini-windows" as illustrated in FIG. 17. These Panes 1710-1730 could be used to manage lists of Associated Objects, organized into separate groups such as all content items (in a Content Pane 1710), all tasks (in a Task Pane 1720), all people (in a People Pane 1730), etc. The IPUI 260 could provide several such Panes, each containing a separate type of Associated Object.

Figure 18:
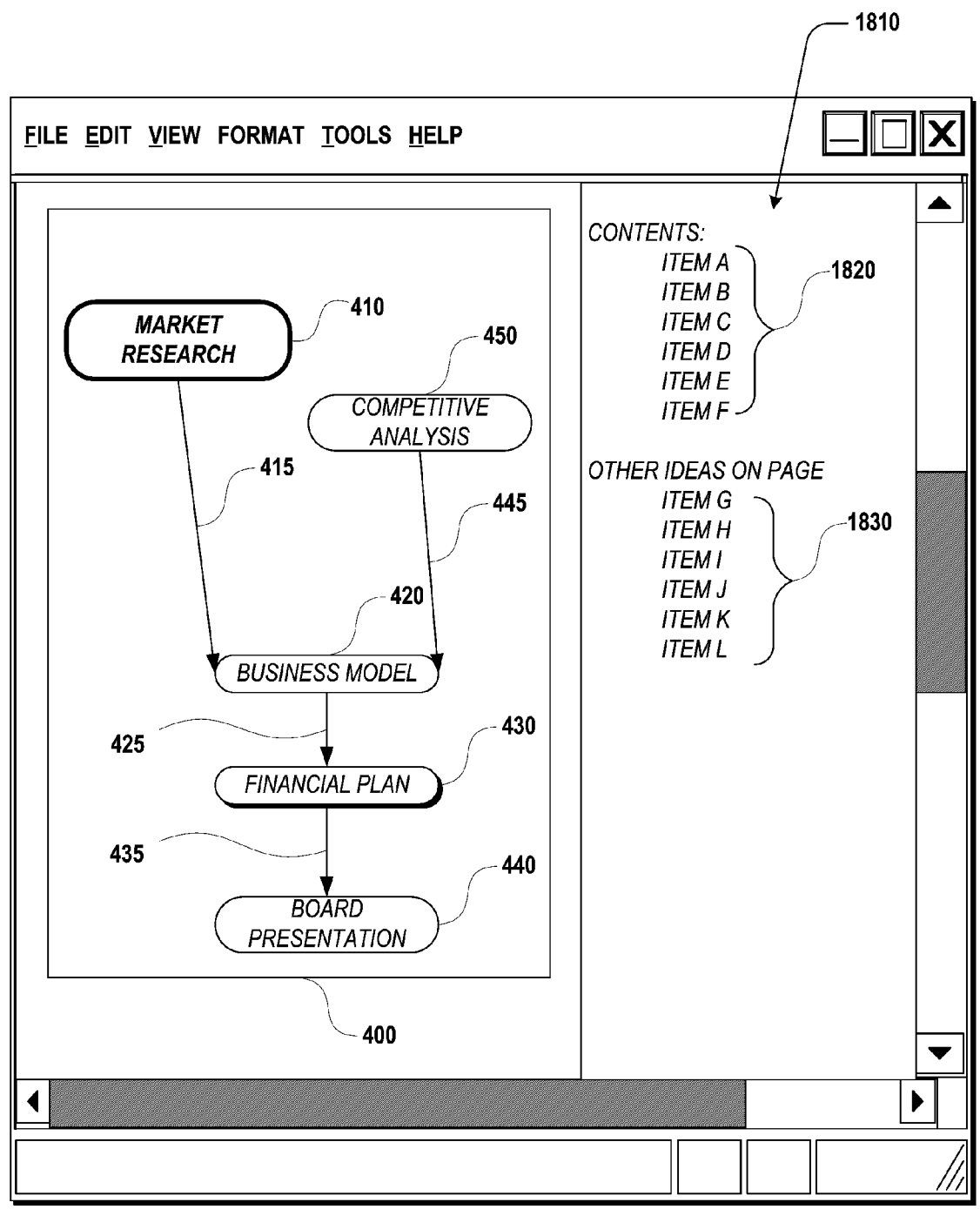

Alternately, Associated Objects could be gathered together in a single Pane 1810 as shown in FIG. 18. Likewise, a user could determine which selection or combination of Panes is displayed at any time.

If separate Panes were used for each type of Associated Object, the Details Sidebar could be organized as illustrated in FIG. 17, which shows the use of a "Content Pane" 1710, a "Task Pane" 1720 and a "People Pane" 1730. (It should be noted that these three Panes are merely illustrative of the kinds of Panes that could be established within the Details Sidebar; they do not imply that only three Panes are possible, or that other types of Panes are not possible.)

The display of lists of Associated Objects within each Pane could be coordinated with the display of Idea Pages within a Workspace canvas as follows: when the user selects an Idea from one of the Workspace canvases, the Panes could filter their views to automatically show only those items that are associated with the selected Idea.

If several Ideas are selected simultaneously in one or more canvases, the Panes could filter their views to automatically show the items that are collectively associated with the selected Ideas. Alternatively, if the Idea Page itself could be selected and the Panes could show the items that are associated with the Idea Page itself. In the example illustrated in FIG. 18, the "Market Research" Idea 410 has been selected.

Alternately, each Pane could include two lists: one showing the items that are associated with the currently selected Ideas on a particular Idea Page, and the other showing items that are associated with the remaining Ideas on the Page, and the Page itself. An example is illustrated in FIG. 18, where one Idea ("Market Research" 410 in this example) has been selected; the Content Pane 1810 shows two lists: one of content items that are associated with the selected Idea 1820, and the other of items that are associated with the other eight Ideas on this Page, and the Page itself 1830.

If any of the currently selected Ideas is Complex, the IPUI 260 could, optionally, show all Associated Objects that are associated with all Ideas contained within the selected Complex Ideas in a so-called "roll-up" view (not shown).

The IPUI 260 could enable the user to select an Item and add one or more Notes (not shown) to it. This could be made possible in several ways, such as enabling the user to select an Item and providing an input window or interactive dialog which allows the user to enter a Note. This Note could be entered manually, or the Note could consist of other digital material such as a voice-capture, scanned image, imported file, etc.

The IPUI 260 could enable the user to select any Item from a Workspace canvas or the Details Sidebar, and use a querying function (not shown), which could, for example, be an interactive dialog, to view, create, manage or update other attributes of the selected Item, such as its Due Date, Priority, etc.

The side-by-side arrangement of the Workspace and Details Sidebar, as illustrated in FIG. 18, could be modified by the user to any other arrangement, such as placing one area above the other, partially overlapping them, placing them as tiled panes within the same window, placing them in completely separate windows, etc.

It could be possible for the user to create other filtered views of Associated Objects: e.g. showing only e-mails; showing only Completed Tasks, etc. The display of these lists in separate windows need not require the viewing area to be simultaneously available or visible.

The user's choice to show some set of lists for a particular Idea on a particular Idea Page (e.g., content, tasks and people related to the "Market Research" Idea 410 in the example shown in FIG. 17), need not imply that all similar or related Ideas, or all Ideas on the same, similar or related Idea Pages, have to support or display the same set of lists. It could be possible for the user to have tasks associated with just some Ideas on an Idea Page and not with other Ideas on the same Page.

Figure 19:
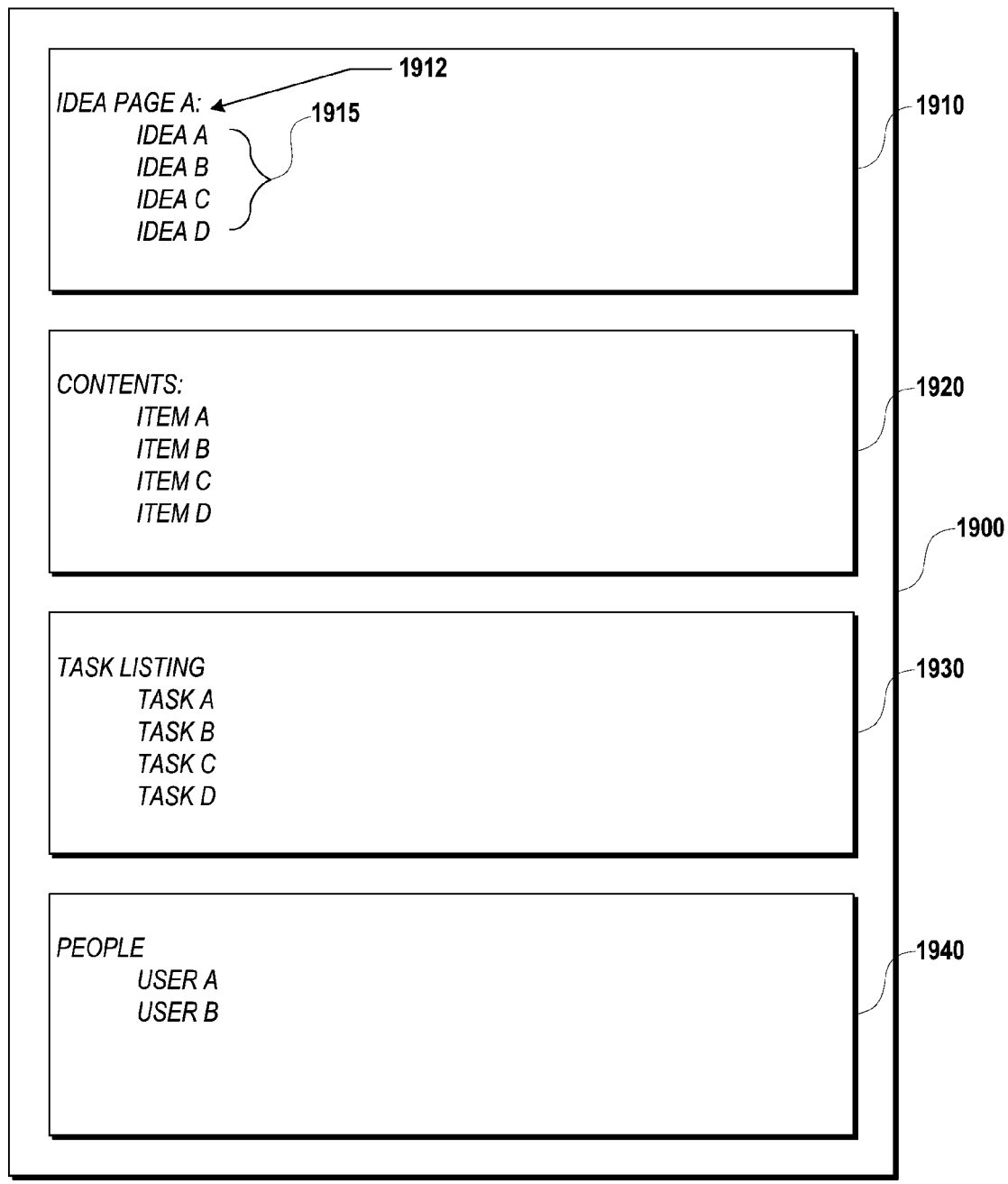

If the user device 200 is a Personal Digital (Data) Assistant ("PDA"), mobile phone, or other device of limited screen resolution and display size, the system 100 could provide an alternate display, as illustrated in an example in FIG. 19. In this example, instead of showing the Ideas 410-450 laid out in the same way as in FIG. 19, the viewing area 1900 shows only a simple listing of the Ideas 1915 contained within a selected Idea Page 1912 of Pane 1910. The various Panes 1920, 1930, 1940 that comprise the Details Sidebar could be shown below the Pane with listing of the Ideas 1910, and the overall schema could be subject to a vertical and/or horizontal scrolling function so that only a limited portion of the overall display is made visible at any time.

Figure 20:
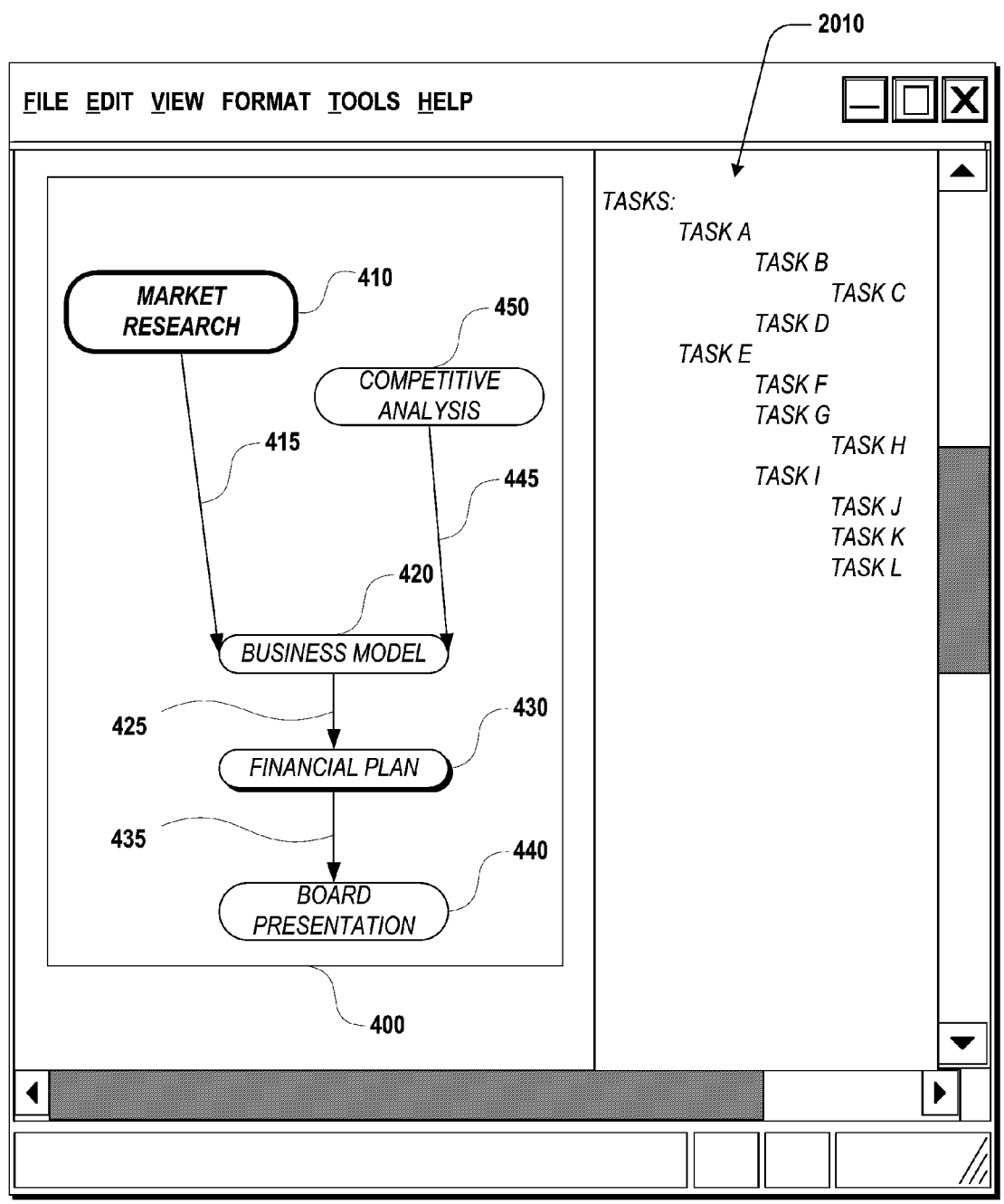

In some embodiments, a Pane within the Details Sidebar could be configured to show structured outlines as indented lists. For example, the "Task Pane" 1720, as illustrated in FIG. 17, could show sub-tasks using an indented structure, as illustrated in the example Pane 2010 in FIG. 20. Such schemas could be used to display and manage work break-down structures or other structured outlines of Items. For example, the IPUI 260 could enable the user to select an item from a list within a Pane and move it inwards or outwards with respect to the indenting or outline structure: this could enable the user to manage a set of tasks, for example, as a work break-down structure.

There are other possible uses of indented lists, similar to those illustrated for lists of tasks associated with Ideas and Idea Pages. Examples of such lists might include: open issues or concerns associated with an Idea or Idea Page, lists of meetings, lists of work assignments, etc.

Figure 21:
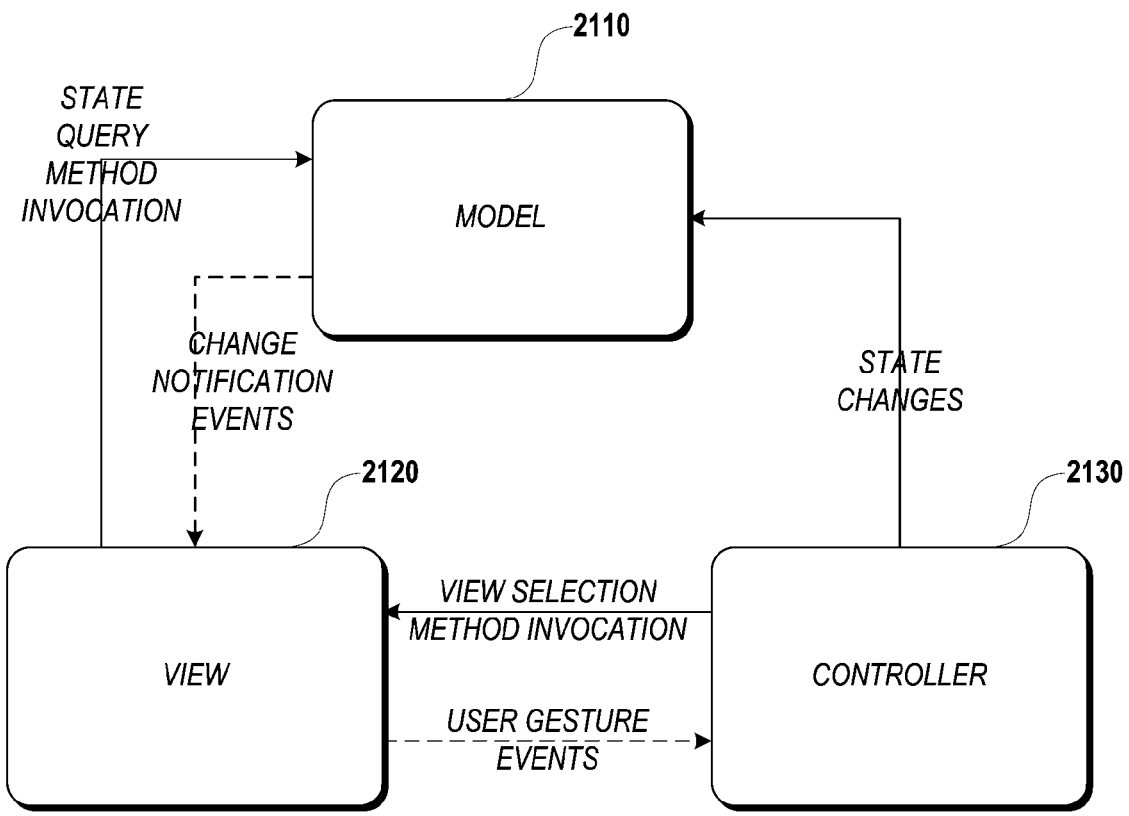
FIG. 21 illustrates an exemplary view of a Model, View, Controller system design in accordance with various embodiments.

A system 100 that provides the functions and IPUI 260 described above could be built using a Model-View-Controller ("MVC") architecture, as illustrated in with FIG. 21. MVC is a design pattern used for building interactive applications that need to maintain multiple views of the same data.

MVC divides applications into three layers (Model 2110, View 2120, and Controller 2130) and decouples their respective responsibilities. Each layer handles specific tasks and has specific responsibilities to the other areas.

A Model 2110 represents business data and business logic or operations that govern access and modification of this business data. Often the Model 2110 serves as a software approximation to real-world functionality. The Model 2110 notifies Views 2120 when it changes and provides the ability for the view to query the Model 2110 about its state. It also provides the ability for the Controller 2130 to access application functionality encapsulated by the Model.

A View 2120 renders the contents of a Model 2110. It accesses data from the Model 2110 and specifies how that data should be presented. The View 2120 updates data presentation when the Model 2110 changes. A View 2120 also forwards user input to a Controller 2130.

A Controller 2130 defines application behavior. It dispatches user requests and selects a View 2120 for presentation. It interprets user inputs and maps them into actions to be performed by the Model 2110. A Controller 2130 selects the next View 2120 to display based on the user interactions and the outcome of the Model 2110 operations. An application may have one Controller 2130 for each set of related functionality. Some applications may use a separate Controller 2130 for each client type, because View interaction and selection often vary between client types.

In addition, the Observer design pattern (not shown) allows several Views 2120 to observe a single Model 2110 and display changes to it while the Model 2110 knows nothing about these Views 2120.

The system 100 could be made operational variously as a Client-Server System, where each user's computer exchanges messages primarily with a central server located on a LAN, WAN or VPN, where the specific network may further be organized, optionally, as multi-tiered or cascaded networks.

Depending upon individual user preferences; environmental considerations, such as security or information management policies, procedures and systems in effect within an organization that deploys the system 100; hardware or software limitations and capabilities such as processing power, memory availability, bandwidth availability, etc; legal, social or public policy considerations or requirements; etc., the system 100 could be configured to centralize storage of all Ideas, Idea Pages and Associated Objects (Items).

An example of such considerations may be found in the financial services industry, where legal obligations regarding preservation of records and communications suggest that a central repository of all system information be maintained for backup or monitoring purposes. Where storage of Items is centralized, the system 100 could be configured to allow individual users with portable computers and electronic devices to have local access to some or all of their Items, when their computer or electronic device is not connected to the central server(s). In such offline access, the system 100 could be configured to allow users to make changes to their local copies of Items; when these users regain connectivity to the central server(s), the system 100 could provide a synchronization function to sort through and help match up changes made by different users to shared Items.

In another embodiment, the system 100 may operate as an Application Service Provider ("ASP") hosted service which is accessed using an Intranet, Extranet, virtual private network ("VPN"), or the public Internet. In an ASP embodiment, the user could be provided with an IPUI 260 as described above for use with a computer that includes a display screen and pointing device, or a so-called "thin client" that contains a minimal user interface for use with an electronic device (e.g., mobile telephone, wireless PDA, etc.).

It should be noted that the terms "ASP" or "hosted service" do not imply that this configuration or implementation would be suitable only in circumstances where a commercial service is being offered by a corporation. It could also, for example, be employed or adapted for purely internal use by an organization, such as a corporation that wishes to offer the system's facilities and functions to its employees while gaining the technological or economic advantages afforded by an ASP configuration.

Another alternative could be to build a Web browser-based front-end where the front-end includes an engine, written in JavaScript and concealed in a hidden frame within the Web browser, which acts as an intermediary between the user and the ASP's servers. The engine would make asynchronous calls to the back-end server, done in anticipation of data requirements for the user based upon the user's recent actions. An example of this approach is illustrated in FIG. 22.

Figure 22:
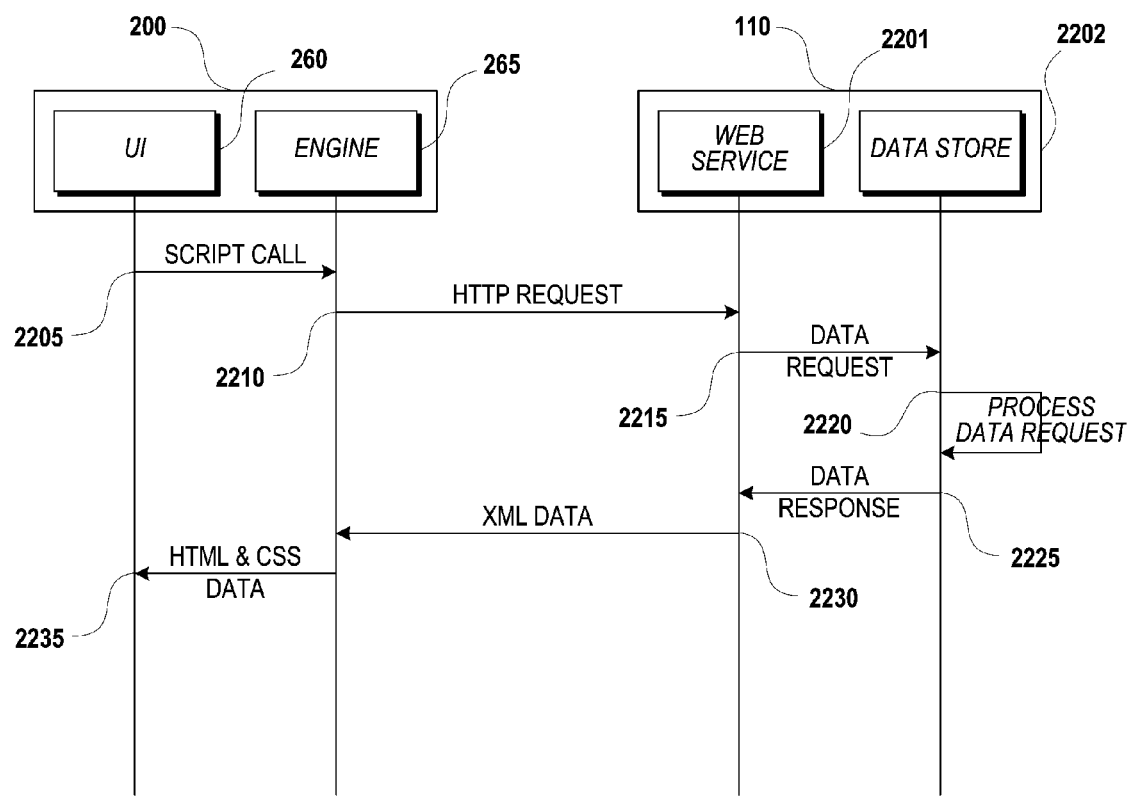
FIG. 22 illustrates an exemplary series of communications between a user device and a server for presenting Ideas in accordance with various embodiments.

In FIG. 22 the IPUI 260 generates 2205 a script call to the Idea Page Engine 265. The Idea Page Engine 265 in turn generates 2210 an HTTP request to the web service 2201 of the Idea Page Server 150. The web service 2201 sends 2215 a data request to a data store 2202 containing Item information. The data store processes 2220 the data request and returns 2225 a data response to the web service 2201. The web service 2201 generates 2230 a data response (e.g., an XML formatted response) to the Idea Page Engine 265. The Idea Page Engine 265 processes the data response to generate 2235 display data (e.g., HTML and Cascading Style Sheet data) for depicting the data response.

The engine 265 could be responsible for both rendering the interface and communicating with the server 110 on the user's behalf. It could allow the user's interaction with the application to happen asynchronously, which could make for better performance and better (perceived) responsiveness to user actions.

Figure 23:
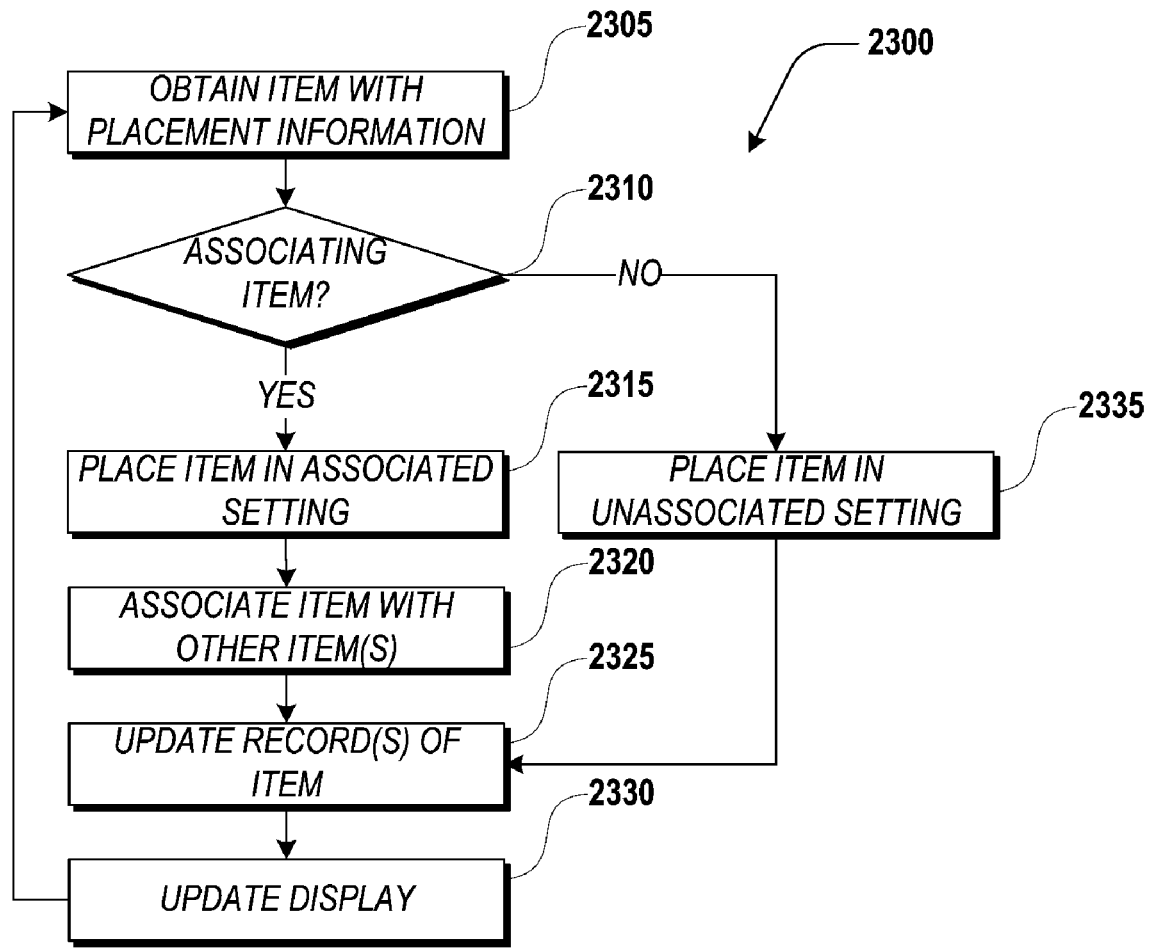
FIG. 23 illustrates an exemplary flow diagram of actions for presenting Ideas in accordance with various embodiments.

An exemplary process for updating the IPUI 260 is illustrated in FIG. 23. The IPUI updating process begins at block 2305 where an Item is obtained along with placement information for the Item within a Canvas or other Workspace. In decision block 2310 a determination is made whether the Item is an associating item, e.g., is it connected in some fashion with any other items in the Workspace? If the Item is an associating Item, in block 2315 the Item is placed in an associated setting in the Workspace. Next, in block 2320 Items to be associated with the placed Item are associated with the Item. In block 2325 these Items of the workspace (and potentially other dependent or otherwise related Items) have their records updated. Next, in block 2330, a display is updated with the updated Items. Processing then cycles back to block 2305.

If in decision block 2310 it was determined that the Item is not an associating Item, processing would proceed directly to block 2325 for. processing as described above.

Every user action that normally would generate an HTTP request could take the form of a JavaScript call to the engine 265 instead. The engine 265 could generate locally any response to a user action that does not require a trip back to the server 110, such as simple data validation, editing data in memory, and even some navigation. If the engine 265 were to need something from the server 110 in order to respond, or if it is submitting data for processing, loading additional interface code, or retrieving new data, the engine 265 could make those requests asynchronously, perhaps using XML, thereby potentially reducing the perceived response time of the system 100.

An ASP service could be configured to keep some or all of the user's data (e.g., Items, configuration data, etc.) on a central server 110. The user may also be provided with local storage capabilities that allow him/her to have access to some or all of the relevant data when he/she is not connected to the ASP's computers or network. This could allow the user to make changes to Items when he/she is not connected to the hosting service's central computers. When these users regain connectivity to the central server(s), the system 100 could provide a synchronization function to sort through and help match up changes made by different users to shared Items.

In a further embodiment, the system 100 may comprise a Peer-to-Peer ("P2P") network, where each user's computer 200 is able to communicate directly with that of other users, with or without the assistance of additional server computers that provide rendezvous and relay services. Additionally, an a so-called "hybrid" P2P network, one or more rendezvous, relay or forwarding servers (not shown) may be needed to help manage connectivity difficulties caused by intervening firewalls or Network Address Translation ("NAT") units, Dynamic Host Control Protocol ("DHCP") implementations, or other considerations such as the temporary absence of some users or computers from the network.

Furthermore, in some embodiments, it may be desirable to utilize a cross-platform system 100. As the community of users who create and share Idea Pages becomes larger, there could be a corresponding benefit to any individual user of the method and system 100 described herein. Therefore, there may be advantages to making the implementation available on a wide variety of computers and electronic devices, such as mobile phones and PDAs. A development approach that employed a cross-platform language like Java could help reduce duplication of effort in making the system 100 available or accessible through a diverse set of computers and electronic devices. Java is not the only cross-platform language available: many other languages such as C, Python, Perl, etc. could provide similar advantages.

In some additional embodiments, a User Interface Toolkit could aid in the implementation of this system 100. Numerous user interface toolkits are available: for use with Java, from Sun Microsystems, Inc. of Santa Clara, Calif.; for example, one could use Eclipse, from Eclipse Foundation of Asheville, N.C.; NetBeans, from Sun Microsystems, Inc. of Santa Clara, Calif.; or Piccolo from the Human-Computer Interaction Lab at the University of Maryland in College Park, Md. It may be noted that Piccolo supports the development of two-dimensional structured graphics programs, in general, and Zoomable User Interfaces ("ZUIs"), in particular. This could aid in the creation and management of Idea Pages, making Piccolo a potentially useful toolkit to adopt in creating the IPUI 260.

Various embodiments may also benefit from the use of Object-Oriented Databases. The data storage requirements of the system 100 could be met using a combination of "flat files" (i.e., ordinary files accessed through the computer's hierarchical file system) and/or a database.

Content items that exist independently of the system 100, e.g., e-mails or bookmarks that existed on the user's computer or electronic device before they were associated with specific Ideas, could remain in place, and the system 100 could simply maintain pointers to these files.

Objects representing Ideas, Idea Pages, Tasks, Notes, etc. that are intrinsic to the system 100 could be stored in flat files or a system-specific database. Using a database could reduce the possibility of these objects being accidentally moved or deleted by the user.

If a database were to be used in implementing the system 100, an object-oriented database ("OODB") may offer some advantages to a relational database ("RDB"), depending upon the computer or electronic device being employed, and the hardware's capabilities, operating system and general operating environment. For example, if an object-oriented language such as Java were used to implement the system 100, an OODB might be easier to incorporate than a RDB.

Alternately, if the Idea Pages were to be implemented as node graphs, a RDB may prove difficult or cumbersome to use in comparison with an OODB since the data contained within the node graphs could have user-defined types along with many recursive references to other nodes. The structures and data access patterns may be more complex than querying rows and columns linked or joined through mapping tables. The normalization of relational databases applied to this model and the object-relational mapping process could represent significant development effort as well as possible system performance impairment.

If the Java language is used to implement portions of the system 100, it may be desirable to employ the Java Data Objects ("JDO") interface. JDO is an interface-based definition of object persistence for Java that describes the storage, querying and retrieval of objects from data stores. Advantages of using JDO for implementing the system 100 might include:

Transparent mapping of JDO instances to the underlying data store.
  There may be no need to add specific methods or attributes to Java classes, or to alter the visibility of class members.
  JDO could be used with a number of different storage paradigms, including RDBs, OODBs, flat files and XML documents.
  Since JDO is transparent to the data store itself, it could aid in porting the system 100 from one vendor's OODB to another's.

Furthermore, If a P2P networking implementation is adopted, the JXTA framework may be helpful, since it offers P2P networking capabilities for programs written in Java. JXTA is a set of open protocols that allow various connected devices, ranging from cell phones and wireless PDAs to computers and servers, to communicate and collaborate in a P2P manner. JXTA peers can create a virtual network where a peer could interact with other peers and resources directly even when some of the peers and resources are behind firewalls and NATs or are on different network transports.

If the system 100 were implemented using Java, JXTA P2P networking and the MVC architecture, it could use a collection of objects and packages, similar to those described below. In the context of the following description, it should be noted that:

Every class described in these packages may subclass the Java class "object.class".

The fictional organization "company" has been used simply to name the packages and classes in a standard Java-format; it has no other implication or effect.

The suggested properties of a package that could be public, as well as suggested variables and properties that might be static, are all capital letters.

Of the various packages that could be used to implement the system 100, the Idea Package would be an important one, and could be organized as describer. Likewise, it could contain objects needed to store the persistent data that might be used by other packages. Examples of persistent data include: Title of Idea; Size (of shape that contains or represents Idea, if any); Location (on screen); Shape (e.g., rectangle, ellipse, etc.); Access Control List; etc. This package could include the following classes:

Idea (com.company.idea)

The purpose of this class could be to hold fundamental information relating to an Idea, such as its name, owner, priority (if any), etc. A suggested set of properties and operations for this class might include the following:

(1) Properties:
    CHILD:int
    DOCUMENT:int
    LOG:Logger
    HIGH:int
    MEDIUM:int
    LOW:int
    PROJECT:int
    RELATIONSHIP:int
    NOTE:int
    TASK:int
    TRASH:int
    acl:Acl
    alarms:List
    alerts:List
    completionDate:long
    createdDate:long
    description:String
    documentPath:String
  dueDate:long
    id:String
    isRecurrence:boolean
    keywords:KeywordTemplate
    lastViewedDate:long
    layout:Layout
    localSerialVersionUID:long
    locations:IdeaTemplate
    lock:String
    modifiedDate:long
    priorityLevel:int
    notes:IdeaTemplate
    serialVersionUID:long
    tasks:IdeaTemplate
    title:String (2) Operations:
  Idea ( )
  addLocation ( )
  addPrincipal ( )
  addNote ( )
  addTask ( )
  applyLock ( )
  checkPermission ( )
  compareTo ( )
  equals ( )
  getAcl ( )
  getAlarms ( )
  getAlerts ( )
  getCompletionDate ( )
  getCreatedDate ( )
  getDescription ( )
  getDocumentPath ( )
  getDueDate ( )
  getExt ( )
  getID ( )
  getKeywords ( )
  getLastViewedDate ( )
  getLayout ( )
  getLocations ( )
  getLockReference ( )
  getModifiedDate ( )
  getPriorityLevel ( )
  getNotes ( )
  getSize ( )
  getTasks ( )
  getTitle ( )
  getType ( )
  hashCode ( )
  isInTrash ( )
  isLocked ( )
  isOwner ( )
  isPublic ( )
  isRecurrence ( )
  readExternal ( )
  removeEntry ( )
  removeLock ( )
  setAcl ( )
  setCompletionDate ( )
  setCreatedDate ( )
  setDescription ( )
  setDocumentPath ( )
  setDueDate ( )
  setExt ( )
  setID ( )
  setIsRecurrence ( )
  setKeywords ( )
  setLastViewedDate ( )
  setLayout ( )
  setLocations ( )
  setModifiedDate ( )
  setOwner ( )
  setPermissions ( )
  setPriorityLevel ( )
  setNotes ( )
  setSize ( )
  setTasks ( )
  setTitle ( )
  setType ( )
  toString ( )
  typeToString ( )
  writeExternal ( )
Child (com.company.idea)

The purpose of this class could be to associate a layout (i.e., position on the screen) with an Idea. A suggested set of properties and operations for this class might include the following:
  (1) Properties:
    LOG:Logger
    idea:Idea
    ext:String
    localSerialVersionUID:long
    serialVersionUID:long
    type:int
  (2) Operations:
    Child ( )
    addLocation ( )
    equals ( )
    getAc ( )
    getDescription ( )
    getExt ( )
    getID ( )
    getLocations ( )
    getNode ( )
    getSize ( )
    getTitle ( )
    getType ( )
    readExternal ( )
    setDescription ( )
    setExt ( )
    setID ( )
    setNode ( )
    setSize ( )
    setTitle ( )
    setType ( )
    typeToString ( )
    writeExternal ( )
Document (com.company.idea)

The purpose of this class could be to wrap files from the local file system on the computer or electronic device that implements this system. A suggested set of properties and operations for this class might include the following:
  (1) Properties:
    DEFAULT:int
    E-MAIL:int
    URL:int
    docType:int
    ext:String
    localSerialVersionUID:long
    logger:Logger
    serialVersionUID:long
    size:long
    type:int
  (2) Operations:
    Document ( )
    equals ( )
    getDocType ( )
    getExt ( )
    getSize ( )
    getType ( )
    isE-mail ( )
    isURL ( )
    readExternal ( )
    setDocType ( )
    setExt ( )
    setSize ( )
    setType ( )
    typeToString ( )
    writeExternal ( )
Task (com.company.idea)

The purpose of this class could be to keep track of tasks that are associated with Ideas. A suggested set of properties and operations for this class might include the following:
(1) Properties:
    LOG:Logger
    ext:String
    localSerialVersionUID:long
    serialVersionUID:long
    type:int
(2) Operations:
    Task ( )
    getExt ( )
    getSize ( )
    getType ( )
    setExt ( )
    setSize ( )
    setType ( )
    typeToString ( )
Project (com.company.idea)
The purpose of this class could be to manage Complex Ideas. A suggested set of properties and operations for this class might include the following:
(1) Properties:
    serialVersionUID:long
    localSerialVersionUID:long
    DEFAULT_TITLE:String
    PROJECT:int
    children:IdeaTemplate
    documents:IdeaTemplate
    relationships:IdeaTemplate
(2) Operations:
    Project ( )
    getType ( )
    setType ( )
    getSize ( )
    setSize ( )
    setExt ( )
    getExt ( )
    getDocuments ( )
    setDocuments ( )
    getRelationships ( )
    setRelationships ( )
    getChildren ( )
    setChildren ( )
    addDocument ( )
    addChild ( )
    addRelationship ( )
    typeToString ( )
    writeExternal ( )
    readExternal ( )
Relationship (com.company.idea)
The purpose of this class could be to manage Ideas that represent relationships between other Ideas, e.g. an arrow that links two Idea shapes within a Workspace canvas. A suggested set of properties and operations for this class might include the following:
(1) Properties:
    BASIC:int
    DEPENDENCY:int
    LOG:Logger
    MAX_WIDTH:int
    ROLE_NULL:String
    ROLE_PRIMARY:String
    ROLE_SECONDARY:String
    buffer:StringBuffer
    ext:String
    localSerialVersionUID:long
    primary:Idea
    relType:int
    secondary:Idea
    serialVersionUID:long
    type:int
(2) Operations:
    Relationship ( )
    getExt ( )
    getNode ( )
    getPrimary ( )
    getRelType ( )
    getRole ( )
    getSecondary ( )
    getSize ( )
    getTitle ( )
    getType ( )
    inRelationship ( )
    isOwner ( )
    readExternal ( )
    removeNode ( )
    setExt ( )
    setPrimary ( )
    setRelType ( )
    setRole ( )
    setSecondary ( )
    setSize ( )
    setType ( )
    toString ( )
    typeToString ( )
    writeExternal ( )
Note (com.company.idea)
The purpose of this class could be to manage Notes that are associated with Ideas, Idea Pages and Associated Objects like content items, etc. A suggested set of properties and operations for this class might include the following:
(1) Properties:
    LOG:Logger
    ext:String
    localSerialVersionUID:long
    serialVersionUID:long
    type:int
(2) Operations:
    Note ( )
    getExt ( )
    getSize ( )
    getType ( )
    setExt ( )
    setSize ( )
    setType ( )
    typeToString ( )
Layout (com.company.idea)
The purpose of this class could be to keep track of the position of an Idea on an Idea Page; it could also be used to maintain other layout information to help in providing zooming views, rotation, etc. A suggested set of properties and operations for this class might include the following:
(1) Properties:
    DEFAULT_ARRANGE_AS:String
    DEFAULT_MATRIX:double [ ]
    arrangeAs:String
    localSerialVersionUID:long
    logger:Logger
    matrix:double [ ]
    point:Point
    serialVersionUID:long
    transform:AffineTransform (2) Operations:
  Layout( )
  clone( )
  equals( )
  getArrangeAs( )
  getMatrix( )
  getOffset( )
  getTransform( )
  hashCode( )
  offset( )
  readExternal( )
  rotate( )
  rotate( )
  scale( )
  setArrangeAs( )
  setMatrix( )
  setMatrix( )
  setOffset( )
  setRotation( )
  setRotation( )
  setScale( )
  setShear( )
  setTranslate( )
  shear( )
  translate( )
  updateMatrix( )
  writeExternal( )
AccessControlledItem (com.company.security.acl)

The purpose of this class could be to help identify the existence of any Access Control Lists, and to help implement these ACLs. A suggested set of properties and operations for this class might include the following:
  (1) Operations
    addPrincipal( )
    checkPermission( )
    getAcl( )
    isOwner( )
    removeEntry( )
    setAcl( )
    setOwner( )
    setPermissions( )
IdentifiableItem (com.company)

The purpose of this class could be to help distinguish an item from others. A suggested set of properties and operations for this class might include the following:
  (1) Operations
    getID( )
    setID( )
Comparable (java.lang)

This is a standard Java class. A possible set of operations of interest for this class might include the following:
  (1) Operations
    compareTo( )
Externalizable (java.io)

This is a standard Java class. A possible set of operations of interest for this class might include the following:
  (1) Operations
    readExternal( )
    writeExternal( )
Object (java.lang)

This is a standard Java class. A possible set of operations of interest for this class might include the following:
  (1) Operations
    Object( )
    clone( )
    equals( )
    finalize( )
    getClass( )
    hashCode( )
    notify( )
    notifyAll( )
    registerNatives( )
    toString( )
    wait( )

Other packages that could be developed to help implement the system 100 include the following:

User: this package could store persistent data about different users. It could contain references to a list of Ideas or Pages with which a particular user is involved. It could include personal information (e.g., name, password, system ID, contact information, etc.).

ACL: this package could manage object security in the form of lists that contain principals, where each principal has a permission level. An object could use this class to determine whether a principal has the sufficient level of permissions needed to perform an action.

Network: this package could define a message object that the system 100 uses to serialize for communications with other users over a network, to break up large messages into smaller chunks, to assemble back together messages from smaller chunks, etc. This package could be developed in a way that allows the system 100 to use JXTA or a variety of other communication protocols, such as other P2P protocols, TCP/IP sockets, etc.

DataAccess: this package could implement a JDO layer and thereby provide an interface or layering of the specific OODB that might be used in implementing the system 100. This package could also, among other functions, handle database transactions and send database transaction events to listeners (e.g., any object that implements the listening interface).

Application: this package could define Models and Controllers according to the MVC architecture (note that Views could be in the UI package). This package could handle interactions with data access layer through the Controllers and Models and also provide an interface between the system 100 and operating system on the computer or electronic device that implements part or all of the system 100. This package could also register and authenticate users.

Although specific embodiments have been illustrated and described herein, it will be appreciated by those of ordinary skill in the art that a wide variety of alternate and/or equivalent implementations may be substituted for the specific embodiments shown and described without departing from the scope of the present invention. This application is intended to cover any adaptations or variations of the embodiments discussed herein. Therefore, it is manifestly intended that this invention be limited only by the claims and the equivalents thereof. More specifically, some extension to and alternate embodiments are described below.

Command-line Access: while the implementation of the system 100 described above suggests the use of a graphical IPUI 260, it may also be advantageous to for a command-line access to the system's features and data. This could allow users to create Ideas, manipulate Idea Pages, associate objects with Ideas, etc. without invoking the a graphical implementation of the IPUI 260.

The command line interface (another form of the IPUI 260) could be developed using a simple text-based menu. A command-line interface could use much of the object model and architecture that has been proposed for the GUI version, with some relatively simple adaptations and extensions to objects to eliminate any dependencies on specific keyboard configurations or the presence or absence and specific capabilities of pointing devices.

Simple GUI: the GUI described above may prove inefficient in circumstances where the user is employing an electronic device (e.g., mobile telephone, PDA, etc.) which offers limited screen size and resolution. Therefore, it may be advantageous to also provide a simpler user interface based upon lists, for example, rather than pictures. Users who access the system 100 variously by means of a computer with a high-resolution screen and an electronic device with low screen resolution may find it advantageous to access the same underlying data (e.g., Ideas, Idea Pages, Associated Objects, etc.) by means of a GUI and a simpler user interface.

Bookmarks: a Bookmark Bar (not shown) could be added to the IPUI 260, for example by placing just below the Tool Bar and above the Workspace. The Bookmark Bar could work similar to bookmark bars in Web browsers such as Microsoft Corporation's Internet Explorer. The user could drag Items onto the Bookmark Bar to create a short-cut to that Item.

Security: the system 100 described above may be enhanced with additional security features for authentication, encryption, non-repudiation, data integrity, etc. One implementation of security might be to incorporate a Public Key Infrastructure ("PKI") model.

Notifications Subsystem: notifications refers to the process by which a user of the system 100 is made aware that an Item to which he/she has access—either as an Owner or as a Recipient—has been modified. While a minimal degree of notifications could be desirable in any implementation of the system 100, this process could be made more elaborate, e.g. by providing filters and preference settings that determine the degree and manner in which any user is provided with notifications: e.g. changes to certain Idea Pages may generate messages to a user's mobile phone or wireless PDA, while other changes to other Idea Pages or other items may simply generate an e-mail message containing the notification.

Similarly, notifications of a similar nature, e.g. all notifications that relate to changes in a particular type of content such as spreadsheets could be grouped together and presented differently from notifications that relate to changes in other types of content.

Calendar Subsystem: to further facilitate the use of Idea Pages in project management, a calendar subsystem could be incorporated into the IPUI 260 which allows for easy scheduling of Items. The calendar could appear as one of the Panes within the Details Sidebar, using the basic IPUI 260 layout proposed in FIG. 17. It could be made possible for the user to drag any Item from a Workspace canvas (or the appropriate Pane within the Details Sidebar in the case of an Associated Object) onto the Calendar using a mouse or other pointing device, thereby establishing, or changing, the Start Date and End Date attributes of the Item.

Once Items have been dragged onto the Calendar Pane, the entries therein could be moved around from one day or hour to another, thereby changing the Start and End Dates, or be stretched or otherwise resized by the user in order to change the proposed duration (i.e., difference between Start and End Dates) of the relevant item.

Furthermore, the Calendar could incorporate an import and export facility, using open standards such as iCalendar in order to provide for easy coordination with other, external calendars maintained by external or third-party applications or other electronic devices, such as mobile phones, wireless PDAs, etc.

Templates: Idea Pages could be used for sundry personal and professional purposes such as managing projects, initiatives and movements, leading discussions, developing and managing communities, and managing organizations and groups. Users could publish, distribute or share process (e.g., industry best practices, corporate standards, etc.) by creating templates from existing Idea Pages. These templates could include any collection of Items.

Importing and Exporting: the system 100 could provide for importing and exporting of Ideas and Idea Pages using industry-standard formats such as XML, as well as proprietary formats that may be developed in the future. This could allow for data interchange between the system 100 and other complementary or supplementary hardware/software such as:

Importing and exporting to project management systems (e.g., Microsoft Corporation's Microsoft Project).

Integration with external supply-chain collaboration software.

Integration with other Web-based systems.

Integration with enterprise resource planning systems, human resource systems, financial systems, customer relationship management systems, general ledger systems, and other corporate information management systems.

Application Programmer Interface ("API"): an API, having a set of defined programmatic interfaces to the system 100, could be created which could allow external or third-party software developers to access the contents of Ideas Pages, including Ideas and Associated Objects.

Audit Trails and Monitoring: the system 100 could be enhanced with additional controls and mechanisms for preserving audit trails, which could, for example, keep activity and usage logs, as well as provide for real-time, batch and post facto monitoring of users. These features could provide automatic alerts to system managers/administrators, as well as filters and reports to create custom views of the usage data, etc.

Organizational Controls: the system 100 could be enhanced to provide additional controls for organizations that deploy the system 100 to their employees, subscribers or other communities, where these controls provide limitations on the kind or size of Items that a user may create, share, manage or remove; restrictions on the kind or size or groups of users that share Items; and similar restrictions that organizations may find useful in managing their use of the system 100.

User Directory Interfaces: the system 100 could also incorporate links or interfaces to external directories or rosters of people, to facilitate the process by which a user could locate other suitable people with whom to share one or more Items. These links could, for example, be based upon the Lightweight Directory Access Protocol ("LDAP") in order to connect to directory systems that maintain user information. Another example might be to connect to online services such as those offered by LinkedIn Corporation of Palo Alto, Calif.

What is claimed is:

1. A computer-implemented method for dynamically modifying a workflow template, the method comprising:

obtaining, by the computer on behalf of a user, a published workflow template from a template publisher, said workflow template having been created in an original context, said workflow template comprising a first plurality of sub-ideas organized within a first-level idea and a second plurality of sub-ideas organized within a second-level idea, said second-level idea corresponding to one of said first plurality of sub-ideas organized within said first-level idea;

determining, by the computer, a user-context associated with said user, said user-context differing from said original context in which said published workflow was created;

copying, by the computer, said published workflow template into said user-context;

determining, by the computer according to said published workflow template, a first visual arrangement for said first plurality of sub-ideas and a second visual arrangement for said second plurality of sub-ideas, said first visual arrangement representing a plurality of associations among said first plurality of sub-idea, said second visual arrangement representing a plurality of associations among said second plurality of sub-ideas, wherein at least one of said first plurality of sub-ideas is arranged as a linker-idea linking at least two others of said first plurality of sub-ideas;

depicting, by the computer, said copied published workflow template in said user-context as a multi-level visual space, including depicting said first visual arrangement as a first-level idea page on a first level in said multi-level visual space and depicting said second visual arrangement as a second-level idea page on a second level of said multi-level visual space; and in response to an indication from said user via said multi-level visual space, associating, by the computer, a digital content item with at least one item selected from said first plurality of sub-ideas, said first-level idea, said second plurality of sub-ideas, and said second-level idea.

2. The method of claim 1, further comprising further customizing said copied published workflow template, including at least one of adding, deleting, or changing at least one of said first plurality of sub-ideas.

3. The method of claim 1, further comprising associating said digital content item with a second item selected from said first plurality of sub-ideas, said first-level idea, said second plurality of sub-ideas, and said second-level idea, such that said digital content item exists in multiple contexts within said copied published workflow template.

4. The method of claim 1, wherein said user-context comprises a root idea page associated with said user.

5. The method of claim 1, further comprising exporting said copied published workflow template to a data-interchange format for use with a third-party software application.

6. The method of claim 1, further comprising:
obtaining a shared item shared by a second user, said shared item comprising at least one of a shared idea and a shared digital content item; and
adding said shared item to said copied published workflow template.

7. The method of claim 6, further comprising:
modifying said shared item; and
notifying said second user that said shared item has been modified.

8. The method of claim 1, further comprising:
selecting an item from among said first plurality of sub-ideas, said first-level idea, said second plurality of sub-ideas, and said second-level idea; and
sharing said selected item with a second user.

9. The method of claim 8, further comprising receiving a notification that said shared selected item has been modified by said second user.

10. The method of claim 8, further comprising making said user aware that said second user has shared selected item.

11. The method of claim 1, further comprising:
obtaining a user-filter setting determining a manner in which said user is to be provided with notifications; and
making said user aware that said second user has shared selected item according to said user-filter setting.

12. The method of claim 1, further comprising sharing said digital content item without sharing said at least one item with which said digital content item is associated.

13. The method of claim 1, further comprising:
receiving at least one item selected from a new idea and a new digital content item;
obtaining a user-created processing rule; and
automatically processing said received at least one item according to said user-created processing rule.

14. The method of claim 13, wherein said received at least one item comprises said new idea, and wherein automatically processing said received at least one item comprises automatically adding said new idea to at least one of said first-level idea and said second-level idea.

15. The method of claim 13, wherein said received at least one item comprises said new digital content item, and wherein automatically processing said received at least one item comprises automatically associating said new digital content item with at least one item selected from said first plurality of sub-ideas, said first-level idea, said second plurality of sub-ideas, and said second-level idea.

16. The method of claim 1, further comprising the computer monitoring activities of said user, including monitoring said associating of said digital content item with said at least one item.

17. The method of claim 16, further comprising logging at least some of said monitored activities of said user to an audit trail.

18. The method of claim 16, further comprising, in response to monitoring said associating of said digital content item with said at least one item, automatically providing an alert to a system manager.

19. A non-transitory computer-readable medium including instructions that, when executed by a processor, perform the method of claim 1.

20. A computing apparatus comprising a processor and a memory including instructions that, when executed by the processor, perform the method of claim 1.

* * * * *